(12) United States Patent
Thiagarajan et al.

(10) Patent No.: US 9,237,560 B2
(45) Date of Patent: Jan. 12, 2016

(54) CYCLIC PREFIX SCHEMES

(71) Applicant: Agency for Science, Technology and Research, Singapore (SG)

(72) Inventors: Lokesh Bheema Thiagarajan, Singapore (SG); Sumei Sun, Singapore (SG); Chau Yuen, Singapore (SG); Quee Seng Tony Quek, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 50 days.

(21) Appl. No.: 14/280,051

(22) Filed: May 16, 2014

(65) Prior Publication Data

US 2014/0247770 A1 Sep. 4, 2014

Related U.S. Application Data

(62) Division of application No. 13/059,747, filed as application No. PCT/SG2009/000286 on Aug. 18, 2009, now Pat. No. 8,768,245.

(60) Provisional application No. 61/089,617, filed on Aug. 18, 2008.

(30) Foreign Application Priority Data

Aug. 18, 2009 (SG) .................. PCT/SG2009/000268

(51) Int. Cl.
  *H04W 84/08* (2009.01)
  *H04W 72/04* (2009.01)
  (Continued)

(52) U.S. Cl.
  CPC ......... *H04W 72/0406* (2013.01); *H04B 7/0626* (2013.01); *H04B 7/155* (2013.01);
  (Continued)

(58) Field of Classification Search
  CPC .... H04B 1/0458; H04B 7/155; H04B 7/0626; H04W 84/08

USPC ................... 455/17, 9, 21; 370/315
See application file for complete search history.

(56) References Cited

U.S. PATENT DOCUMENTS 5,561,468 A 10/1996 Bryan et al.
6,169,723 B1 1/2001 Fertner et al.
(Continued)

FOREIGN PATENT DOCUMENTS

CN 101048992 A2 10/2007
EP 1615354 A2 1/2006
(Continued)

OTHER PUBLICATIONS

Jiang et al., "MIMO OFDM Frequency Offset Estimator with Low Computational Complexity", in proceedings of IEEE ICC 2007, Jun. 24-28, 2007, pp. 5449-5454.
(Continued)

*Primary Examiner* — Hai V Nguyen
(74) *Attorney, Agent, or Firm* — Kramer Levin Naftalis & Frankel LLP (57) ABSTRACT

Methods and systems are proposed for transmitting data from a source (110) to a destination (130) via a relay station (120) having multiple antennae (122, 124). The relay station (120) receives from the source a message containing the data and a first cyclic prefix. It does this using each of its antennae (122, 124), so producing multiple respective received signals. In certain embodiments, the relay station (120) removes the first cyclic prefix from the received signals, replacing it with a new one. In other embodiments, the relay station (120) removes only a portion of the first cyclic prefix. In either case, the relay station (120) may apply space-time coding to generate second signals, which it transmits to the destination (130), which extracts the data. Methods are also proposed for estimating parameters of the channel, to enable the destination (130) to decode the data.

12 Claims, 4 Drawing Sheets

US 9,237,560 B2

Page 2

(51) Int. Cl.
*H04B 7/155* (2006.01)
*H04B 7/26* (2006.01)
*H04L 1/06* (2006.01)
*H04L 25/02* (2006.01)
*H04L 27/26* (2006.01)
*H04B 7/06* (2006.01)

(52) U.S. Cl.
CPC ........... *H04B 7/2606* (2013.01); *H04L 1/0618* (2013.01); *H04L 25/0204* (2013.01); *H04L 25/0224* (2013.01); *H04L 25/0226* (2013.01); *H04L 27/2602* (2013.01); *H04L 27/2607* (2013.01); *H04L 27/2613* (2013.01)

(56) References Cited

U.S. PATENT DOCUMENTS

| | | | |
|---|---|---|---|
| 7,020,072 B1 | 3/2006 | Li et al. | |
| 7,061,969 B2* | 6/2006 | Alamouti | H04B 7/0617 375/147 |
| 7,209,433 B2* | 4/2007 | Scarpa | H04L 25/0236 370/206 |
| 7,248,841 B2* | 7/2007 | Agee | H04B 7/0417 455/101 |
| 7,333,531 B2* | 2/2008 | Alamouti | H04B 7/0617 375/147 |
| 7,394,754 B2* | 7/2008 | Li | H04L 27/2626 370/208 |
| 7,433,433 B2* | 10/2008 | Wilhelmsson | H04L 25/0222 375/350 |
| 7,519,122 B2* | 4/2009 | Hayashi | H04L 25/0232 375/260 |
| 7,525,939 B2* | 4/2009 | Abe | H04B 7/026 370/226 |
| 7,623,487 B2* | 11/2009 | Zhang | H04L 5/0023 370/208 |
| 7,639,639 B2* | 12/2009 | Herdin | H04B 7/15542 370/310 |
| 7,684,337 B2* | 3/2010 | Mehta | H04B 7/026 370/237 |
| 7,725,074 B2* | 5/2010 | Nishio | H04B 7/15542 455/13.1 |
| 7,747,250 B2* | 6/2010 | Larsson | H04L 25/03343 342/174 |
| 8,023,400 B2* | 9/2011 | Jung | H04B 7/155 370/210 |
| 8,023,445 B2* | 9/2011 | Jung | H04B 7/155 370/315 |
| 8,050,311 B2* | 11/2011 | Larsson | H04B 7/022 342/353 |
| 8,112,033 B2* | 2/2012 | Xue | H04B 7/15521 370/274 |
| 8,135,337 B2* | 3/2012 | Larsson | H04B 7/15592 455/11.1 |
| 8,199,794 B2* | 6/2012 | Bauch | H04B 7/2606 375/211 |
| 8,254,830 B2* | 8/2012 | Choi | H04B 7/2606 455/11.1 |
| 8,374,542 B2* | 2/2013 | Choi | H04B 7/2606 370/315 |
| 8,451,916 B2* | 5/2013 | Kwon | H04B 7/15592 370/208 |
| 8,451,951 B2* | 5/2013 | Caire | H04L 1/0003 375/340 |
| 8,477,677 B2* | 7/2013 | Naden | H04B 7/15592 370/315 |
| 8,509,337 B2* | 8/2013 | Han | H04B 7/0667 375/267 |
| 8,514,913 B2* | 8/2013 | Heath, Jr. | H04B 7/15535 375/214 |
| 8,565,329 B2* | 10/2013 | Papadopoulos | H04L 25/03216 375/267 |
| 8,620,230 B2* | 12/2013 | Sanderovitz | H04B 7/022 455/101 |
| 8,630,580 B2* | 1/2014 | Sun | H04B 7/155 370/315 |
| 8,634,763 B2* | 1/2014 | Oyman | H04B 7/024 370/310 |
| 8,768,245 B2* | 7/2014 | Thiagarajan | H04B 7/155 370/315 |
| 8,831,043 B2* | 9/2014 | Seo | H04B 7/026 370/274 |
| 8,838,020 B2* | 9/2014 | Maddah-Ali | H04B 7/1555 455/11.1 |
| 8,917,649 B2* | 12/2014 | Sfar | H04B 7/15592 370/315 |
| 2003/0125067 A1* | 7/2003 | Takeda | H04W 52/247 455/522 |
| 2004/0022183 A1* | 2/2004 | Li | H04L 27/2626 370/210 |
| 2004/0192204 A1* | 9/2004 | Periyalwar | H04W 52/46 455/25 |
| 2004/0266339 A1* | 12/2004 | Larsson | H04B 7/022 455/7 |
| 2006/0176973 A1* | 8/2006 | Alamouti | H04B 7/0617 375/267 |
| 2006/0239335 A1* | 10/2006 | Rouphael | H04B 1/7107 375/148 |
| 2007/0165581 A1* | 7/2007 | Mehta | H04B 7/026 370/338 |
| 2007/0292131 A1 | 12/2007 | Slobodyanyuk et al. | |
| 2008/0013520 A1* | 1/2008 | Liu | H04B 7/15542 370/347 |
| 2008/0043711 A1* | 2/2008 | Hart | H04J 3/0632 370/348 |
| 2008/0043712 A1* | 2/2008 | Hart | H04B 7/15507 370/348 |
| 2008/0056175 A1* | 3/2008 | Jung | H04B 7/155 370/315 |
| 2008/0112497 A1 | 5/2008 | Shan et al. | |
| 2008/0125109 A1* | 5/2008 | Larsson | H04L 25/03343 455/424 |
| 2009/0011700 A1* | 1/2009 | Nishio | H04B 7/15542 455/7 |
| 2009/0175214 A1* | 7/2009 | Sfar | H04B 7/15592 370/315 |
| 2009/0190634 A1* | 7/2009 | Bauch | H04B 7/2606 375/211 |
| 2009/0207954 A1* | 8/2009 | Dai | H04J 3/0605 375/345 |
| 2009/0303918 A1* | 12/2009 | Ma | H04B 7/2606 370/315 |
| 2010/0142436 A1* | 6/2010 | Hart | H04B 7/15507 370/315 |
| 2010/0157901 A1* | 6/2010 | Sanderovitz | H04B 7/022 370/328 |
| 2010/0203826 A1* | 8/2010 | Xue | H04B 7/15521 455/9 |
| 2010/0272005 A1* | 10/2010 | Larsson | H04B 7/15564 370/315 |
| 2010/0303032 A1* | 12/2010 | Seo | H04B 7/026 370/329 |
| 2010/0322140 A1* | 12/2010 | Kwon | H04B 7/15592 370/315 |
| 2011/0069780 A1* | 3/2011 | Novak | H04B 7/0667 375/295 |
| 2011/0090997 A1* | 4/2011 | Han | H04B 7/0667 375/354 |
| 2011/0116432 A1* | 5/2011 | Doppler | H04B 7/155 370/312 |
| 2011/0128916 A1* | 6/2011 | Kwon | H04W 52/0206 370/328 |
| 2011/0134968 A1* | 6/2011 | Han | H04L 27/2626 375/146 |
| 2011/0165834 A1* | 7/2011 | Hart | H04J 3/0632 455/7 |
| 2011/0199913 A1* | 8/2011 | Sundaresan | H04L 12/1881 370/243 |
| 2011/0207399 A1* | 8/2011 | Thiagarajan | H04B 7/155 455/21 |
| 2012/0028570 A1* | 2/2012 | Sun | H04B 7/155 455/9 |

(56) References Cited

U.S. PATENT DOCUMENTS

2014/0247770 A1* 9/2014 Thiagarajan ...... H04W 72/0406
370/315
2014/0334461 A1* 11/2014 Naden ................ H04B 7/15592
370/336

FOREIGN PATENT DOCUMENTS

| WO | WO 2004/107693 A1 | 12/2004 |
|---|---|---|
| WO | 2006/021939 A2 | 3/2006 |
| WO | WO 2006/121381 A1 | 11/2006 |
| WO | WO 2008/097036 A1 | 8/2008 |

OTHER PUBLICATIONS

Kay, S., "A Fast and Accurate Frequency Estimator," IEEE Trans. Signal Processing, vol. 37, pp. 1987-1990. Dec. 1989.
Yindi, Jing et al., "Distributed Space-Time Coding in Wireless Relay Networks", IEEE Transactions on Wireless Communications, vol. 5, No. 12, Dec. 2006.
Zheng, Li et al., "A Simple Alamouti Space-Time Transmission Scheme for Asynchronous Cooperative Systems", IEEE Signal Processing Letters, vol. 14, No. 11, Nov. 2007.
Heimiller, R.C., et al., "Phase Shift Pulse Codes with Good Periodic Correlation Properties", IEEE Xplore, Dec. 29, 2009, pp. 254-257.
Popovski, Petar, et al., "Physical Networking Coding in Two-Way Wireless Relay Channels", Dept. of Electronic Systes, Aalborg University. Date Unknown.
Jing, Yindi, "Using Orthogonal and Quasi-Orhogonal Designs in Wireless Relay Networks", IEEE, vol. 53, No. 11, Nov. 11, 2007.
Soldani, David, et al., "Wireless Relays for Broadband Access", Radio Communications Series, IEEE Communications Magazine, Mar. 2008, pp. 58-66.
Katti Sachin, et al., "XORs in the Air: Practical Wireless Network Coding", MIT CSAIL, University of Cambridge, Sep. 11-15, 2006, Pisa, Italy, pp. 243-254.
"Shift Register Sequences" by Aegean Park Press, Chapter III, Sequences with Randomness Properties, pp. 24-89.
Chinese Office Action 200335 dated May 30, 2013.

* cited by examiner

CYCLIC PREFIX SCHEMES

FIELD OF THE INVENTION

This invention relates to methods and systems for implementing cyclic prefixes in a wireless communication channel comprising a relay station capable of performing information coding, particularly but not exclusively, analog space-time coding.

CROSS-REFERENCE TO RELATED APPLICATIONS

The present application is one of two patent applications claiming priority from U.S. provisional patent application No. 61/089,617. The present patent application relates to the usage of cyclic prefixes, whereas the other patent application relates to techniques for space-time coding. The techniques described in the respective two patent applications are independent since either can be used without the other, although it is equally possible to construct systems which combine techniques from the respective two patent applications.

BACKGROUND OF THE INVENTION

Wireless relays have shown potential for extending communication range and providing good quality of experience. In a typical wireless communication system utilizing relays, the relay station would be time shared between different sources and destination. In such a scenario, the relay station needs to estimate the Angular Carrier Frequency Offset (ACFO) present between each pair of source and relay antennae (denoted ACFO $\Phi_r$). The ACFO that is present between each pair of relay and destination antennae (denoted ACFO $\Phi_d$) will be compensated for at the destination.

Joint compensation of the source to relay and relay to destination ACFO is not possible in the prior art. Compensation for the source to relay ACFO $\Phi_r$ can thus only be performed at the relay station. The relay station of the prior art will need to estimate and compensate the ACFO for each source-and-relay pair and this complicates the relay station hardware and increases the power required by the relay station.

Implementations of analog space-time coding (ASTC) in the prior art also have the limitation that the transmission channel has to be flat fading. This is because inter-symbol interference (ISI) results when the transmission channel has frequency selective fading. The insertion of a cyclic prefix (CP) can be used to mitigate against ISI. The cyclic prefix inserted should preferably be of a length greater than that of the channel impulse response (CIR).

Typical implementations of ASTC also require that the samples within a signal be re-ordered when performing the coding.

It is an object of the present invention to provide a method for implementing cyclic prefixes and compensating for the channel effects of a wireless communication channel, which addresses at least one of the problems of the prior art and/or to provide the public with a useful choice.

SUMMARY OF THE INVENTION

In general terms, the present invention relates to transmitting data though a wireless communication channel from a source to a destination via a relay station having multiple antennae. The relay station receives a message from the source containing the data and a first cyclic prefix. It does this using each of its antennae, so producing multiple respective received signals. In a first aspect of the invention, the relay station removes the first cyclic prefix from the received signals, replacing it with a new one. In a second aspect of the invention, the relay station removes only a portion of the first cyclic prefix. In either case, the relay station may apply space-time coding to generate second signals, which it transmits to the destination, which extracts the data. A further aspect of the invention relates to estimating parameters of the channel, to enable the destination to decode the data.

The invention may be expressed alternatively as an integrated circuit configured to enable the above mentioned aspects of the invention.

The cyclic prefix schemes of the present invention do not require that the transmission channels be flat fading.

BRIEF DESCRIPTION OF THE DRAWINGS

By way of example only, embodiments will be described with reference to the accompanying drawings, in which.

DETAILED DESCRIPTION OF THE PREFERRED EMBODIMENTS

Figure 1:
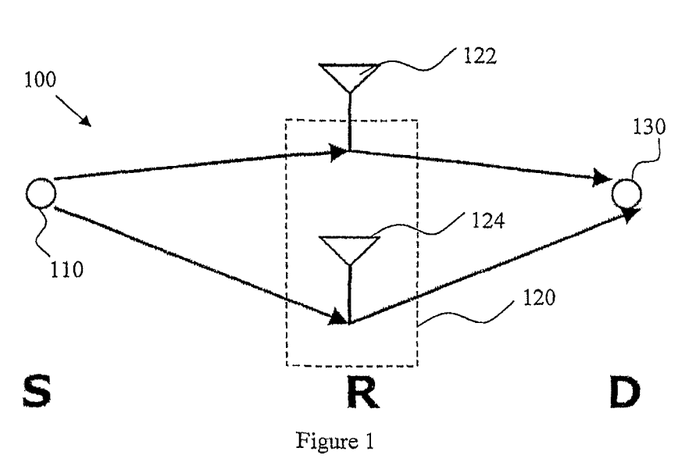
FIG. 1 is a schematic drawing of a communication channel having a source station S, relay station R and destination station D, according to an embodiment of the invention.

FIG. 1 shows a communication channel according to an example embodiment. This channel consists of a source station/node 110 (S), a relay station 120 (R) and a destination station/node 130 (D). The source and the destination each have only one antenna, and the relay station 120 has two antennae 122,124. The antennae at the source station/node 110, the relay station 120 and the destination station/node 130 can be configured to both transmit and receive. The source 110 sends signals to the relay station 120, and the relay station 120 sends signals to the destination 130. The signals sent from the source 110 to the relay station 120, and from the relay station 120 to the destination 130 may comprise multiple orthogonal carrier frequencies, such as in the case where OFDM modulation is used.

The present embodiment includes only one relay station 120. An ASTC relaying scheme is applied using orthogonal frequency division multiplexing (OFDM) modulation at the source 110. ASTC encoding is applied to individual carriers over two consecutive OFDM symbol periods. The relay station 120 receives the OFDM signal using the two antennae 122, 124. It does simple analog processing (such as the sampling and storage of discrete time signals) of the received signal and performs coding. This coding can for example be 2×2 Alamouti coding. The coded signal is then transmitted to the destination node/station 130.

To avoid interference, the data transmission from the source node/station 110 to destination node/station 130 takes place over two phases. The transmission cycle thus consists of two phases. In the first phase, the source node/station 110 to relay station 120 link is activated and the destination node/station 130 remains silent. In the second phase, the relay station 120 to destination node/station 130 link is activated and the source node/station 110 remains silent.

Simulations of the present embodiment were conducted using 16 carriers in each OFDM symbol. This however does not limit the number of carriers to 16 and a skilled reader will understand that the number of carriers can be varied.

Alternative embodiments may also apply the ASTC relaying schemes to single-carrier cyclic prefix (SC-CP) systems where the ASTC encoding is also applied to individual symbols over two consecutive SC-CP blocks.

Alternative embodiments may also have more than two antennae at the relay station 120, in which case antenna selection can be adopted. Only two antennas are selected to implement the proposed schemes based on pre-defined selection criteria, e.g., best product channel SNR, etc.

Alternative embodiments may also have multiple relay stations where relay selection can be performed in which one relay station is selected to implement the proposed schemes based on a pre-determined selection criteria, e.g., best product channel SNR, etc.

Alternative embodiments may also have multiple relay stations where Coordinated Delay ASTC is implemented at each relay station, and the coordinated delays are applied at different relay station. In this case, the delay durations applied at the different relay station is a design parameter obtained from a central control. This embodiment may have the advantage that the carrier frequencies do not have to be orthogonal and thus signal collisions will not occur.

Alternative embodiments may also have only one antenna at the relay station 120. In this case, a solution is to implement cooperation using at least two relay sub-stations, where each relay sub-station is a relay station capable of performing information passing with other relay sub-stations. Information passing is implemented between the at least two relay sub-stations and the at least two relay sub-stations can then participate in the ASTC transmission.

Angular Carrier Frequency Offset (ACFO)

Let the number of carriers be N. The source 110 to relay station 120 and relay station 120 to destination 130 channels are assumed to be frequency selective multipath fading channels. Let the vectors $h_{S,1}$ and $h_{S,2}$ respectively denote the channel impulse response (CIR) from the source 110 to the first and second antennae 122, 124 of the relay station 120. $h_{S,1}$ and $h_{S,2}$ both have the size of ($L_1 \times 1$). Similarly, let the vectors $h_{1,D}$ and $h_{2,D}$ respectively denote the CIR from the first and second antennae 122, 124 of the relay station 120 to the destination 130. $h_{1,D}$ and $h_{2,D}$ both have the size of ($L_2 \times 1$). Let $f_0$, $f_r$ and $f_d$ be the carrier frequency of the local oscillators at the source 110, relay station 120 and destination 130, respectively. Then $\Delta f_r = f_0 - f_r$ and $\Delta f_d = f_0 - f_d$ respectively denote the CFO at the relay 120 and destination 130. The source 110, relay station 120 and destination 130 can have independent local oscillators and thus their oscillating frequency need not be the same. This results in independent CFOs in the signal received at relay station 120 and the destination 130 i.e. $\Delta f_r \neq \Delta f_d$.

The angular CFO (ACFO) is defined as $$\phi_r = \frac{2\pi}{N}(\Delta f_r)T$$

$$\phi_d = \frac{2\pi}{N}(\Delta f_d)T,$$

where $\Phi_r$ denotes the ACFO that is present at the channels between the source 110 and either antenna 122, 124 of the relay station 120, and $\Phi_d$ denotes the ACFO that is present at the channels between either antenna 122, 124 of the relay station 120 and the destination 130. T denotes the OFDM symbol duration. Scalars $\epsilon_r = (\Delta f_r)T$ and $\epsilon_d = (\Delta f_d)T$ are referred to as normalized CFOs and their magnitudes are bounded by $|\epsilon_r| \leq 0.5$ and $|\epsilon_d| \leq 0.5$.

The ACFO $\Phi_r$ and/or $\Phi_d$ can be estimated during channel estimation and are used to perform compensation either at the relay station 120, or at the destination 130.

Joint ACFO compensation can also be performed at the destination 130, in which case no ACFO compensation needs to be done at the relay station 120. What this means is that compensation for $(\Phi_r + \Phi_d)$ is done at the destination 130.

If the CFOs present in the signal received at the relay station 120 and destination 130 are not properly compensated, then the gains due to the relaying and usage of OFDM modulation cannot be realized.

Joint ACFO compensation when done at the destination 130 is advantageous as it keeps the relay carrier frequency unaffected for any source-and-destination pair.

Joint ACFO compensation when done at the destination 130 is also advantageous as it simplifies the implementation of the relay station 120 and reduces the computational complexity at the relay station 120.

Cyclic Prefix Schemes with Carrier Frequency Offset (CFO) Compensation

The embodiment employs two cyclic prefix schemes which are described below with their associated methods of performing carrier frequency offset (CFO) compensation. The Cyclic Prefix Schemes 1 and 2 of the present invention permits the implementation of space-time codes with minimum signal processing complexity at the relay station.

It is understood that the term "CP Scheme 1" is also used in this document to refer to the Cyclic Prefix Scheme 1 and "CP Scheme 2" is also used to refer to the Cyclic Prefix Scheme 2.

Cyclic Prefix Scheme 1

Figure 2:
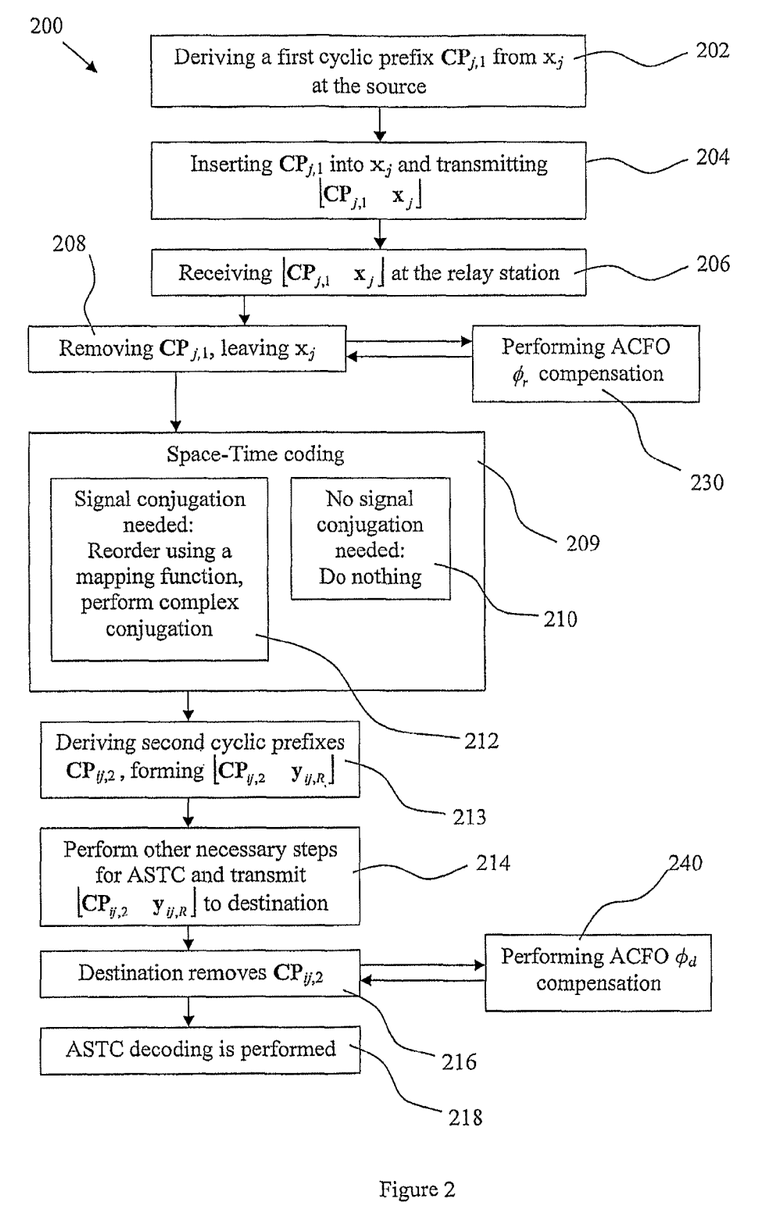
FIG. 2 is a flow diagram of a scheme for inserting cyclic prefixes according to a Cyclic Prefix Scheme 1 of the example embodiment.

FIG. 2 shows a scheme for inserting cyclic prefixes according to the example embodiment. Let $x_j$ be a (N×1) vector containing the N data symbols to be transmitted during a j-th OFDM symbol duration.

While this example embodiment of the invention has been described using 2 OFDM symbols i.e. $x_{2n}$ and $x_{2n+1}$, it is clear that the use of a different number of OFDM symbols is possible within the scope of the invention, as will be clear to a skilled reader.

In step 202, the source derives a first cyclic prefix (denoted $CP_{j,1}$) with length $P_1 = L_1 - 1$ from $x_j$. $L_1$ is the length of the channel impulse response (CIR) represented by $h_{S,1}$ and $h_{S,2}$ respectively for the channel between the source and the first antenna of the relay station, and the channel between the source and the second antenna of the relay station.

In step 204, the source inserts $CP_{j,1}$ in front of $x_j$ and then transmits the resultant symbol sequence.

Let the symbol sequence $x_j$ consisting of N symbols be denoted by $x_n$ where n=0 ... N-1, i.e.

$$x_j = [x_0 \ldots x_n \ldots x_{N-1}]$$

The cyclic prefix $CP_{j,1}$ of length $P_1$ is created by copying the last $P_1$ symbols of $x_j$ $$CP_{j,1} = [x_{N-P_1} \ldots x_{N-2} x_{N-1}]$$

The cyclic prefix $CP_{j,1}$ is inserted in front of $x_j$, producing the resultant symbol sequence $\lfloor CP_{j,1} \; x_j \rfloor$ for transmission.

The transmission from the source to relay station takes place in the first phase of the transmission cycle.

In step 206, the relay station receives $\lfloor CP_{j,1} \; x_j \rfloor$ at both antennae of the station.

In step 208, after performing time synchronization, the $CP_{j,1}$ portion of length $P_1$ in each OFDM symbol is removed leaving $x_j$. Should ACFO be present, the signal vectors received over the span of 2 OFDM symbol durations i.e. for j={2n, 2n+1} are given after the removal of $CP_{j,1}$ as $$\begin{bmatrix} r_{R,1,2n} & r_{R,1,2n+1} \\ r_{R,2,2n} & r_{R,2,2n+1} \end{bmatrix} =$$

$$\begin{bmatrix} e^{j(2n(N+P_1)+P_1)\phi_r} Z_N(\phi_r) H_{S,1} W_N^H x_{2n} & e^{j((2n+1)(N+P_1)+P_1)\phi_r} Z_N(\phi_r) H_{S,1} W_N^H x_{2n+1} \\ e^{j(2n(N+P_1)+P_1)\phi_r} Z_N(\phi_r) H_{S,2} W_N^H x_{2n} & e^{j((2n+1)(N+P_1)+P_1)\phi_r} Z_N(\phi_r) H_{S,2} W_N^H x_{2n+1} \end{bmatrix} + \begin{bmatrix} v_{R,1,2n} & v_{R,1,2n+1} \\ v_{R,2,2n} & v_{R,2,2n+1} \end{bmatrix}$$

$r_{R,i,j}$ denotes the received signal vector obtained after the removal of $CP_{j,1}$, with i and j respectively denoting the antenna index and OFDM symbol duration. $r_{R,i,j}$ has the size of (N×1). n denotes the data transmission cycle index. The (N×N) matrix $W_N^H$ is the inverse discrete Fourier transform (IDFT) matrix. The first column vector of the (N×N) circulant matrices $H_{S,1}$ and $H_{S,2}$ are $[h_{S,1}^T, 0_{1\times(N-L)}]^T$ and $[h_{S,2}^T, 0_{1\times(N-L)}]^T$, respectively.

Vector $v_{R,i,j}$ contains N samples of additive white Gaussian noise (AWGN) that distorts the signal received by the i-th relay antenna during j-th OFDM symbol duration. If 2d OFDM symbols are transmitted in each cycle with d being an integer value, then the matrix $$V = \begin{bmatrix} v_{R,1,2n} & v_{R,1,2n+1} \\ v_{R,2,2n} & v_{R,2,2n+1} \end{bmatrix}$$

will be of dimension (2N×2d) with OFDM symbol indexes of 2dn, 2dn+1, 2dn+2, . . . , 2dn+2d−1.

It is assumed that the covariance of $v_{R,i,j}$, $$E[v_{R,i,j} v_{R,i,j}^H] = \sigma_R^2 I_N \text{ for } i=1,2 \text{ and } j=2n,2n+1 \text{ for } d>1.$$

Optionally, in the event that ACFO is present, compensation of ACFO $\Phi_r$ can be performed at the relay station as step 230.

Assuming the complete removal of ACFO or if ACFO was absent, over the span of 2 OFDM symbol durations i.e. for j={2n, 2n+1}, the received signal vectors obtained after the removal of $CP_{j,1}$ at the relay are given as follows:

$$\begin{bmatrix} r_{R,1,2n} & r_{R,1,2n+1} \\ r_{R,2,2n} & r_{R,2,2n+1} \end{bmatrix} = \begin{bmatrix} H_{S,1} W_N^H x_{2n} & H_{S,1} W_N^H x_{2n+1} \\ H_{S,2} W_N^H x_{2n} & H_{S,2} W_N^H x_{2n+1} \end{bmatrix} + \begin{bmatrix} v_{R,1,2n} & v_{R,1,2n+1} \\ v_{R,2,2n} & v_{R,2,2n+1} \end{bmatrix},$$

Step 209 is then performed at the relay station. In step 209, Simple processing is performed in order to implement space-time coding at the carrier level. The matrix $Y_R$ is computed and arranged:

$$Y_R = [y_{ij,R}] = \begin{bmatrix} y_{11,R} & y_{12,R} \\ y_{21,R} & y_{22,R} \end{bmatrix} = \begin{bmatrix} r_{R,1,2n} & r_{R,1,2n+1} \\ \zeta(r_{R,2,2n+1}^*) & -\zeta(r_{R,2,2n}^*) \end{bmatrix}$$

The space-time code implemented can for example be the Alamouti code.

Given that $$H_{S,i} W_N^H x_j = W_N^H \Lambda_{S,i} x_j \text{ for } j=2n,2n+1 \text{ and } i=1,2,$$

where $\Lambda_{S,i}$ is a (N×N) sized diagonal matrix whose diagonal elements are given by the N-point DFT of CIR $h_{S,i}$ for i=1, 2, i.e., $\Lambda_{S,i} = \sqrt{N} \text{ diag}(W_N[h_{S,i}^T, 0_{1\times(N-L_i)}]^T)$, it can be shown that $$Y_R = \begin{bmatrix} r_{R,1,2n} & r_{R,1,2n+1} \\ \zeta(r_{R,2,2n+1}^*) & -\zeta(r_{R,2,2n}^*) \end{bmatrix}$$

$$= \frac{1}{\sqrt{2}} \begin{bmatrix} W_N^H \Lambda_{S,1} x_{2n} & W_N^H \Lambda_{S,1} x_{2n+1} \\ W_N^H Z_N\left(\frac{2\pi}{N}\right) \Lambda_{S,2}^* x_{2n+1}^* & -W_N^H Z_N\left(\frac{2\pi}{N}\right) \Lambda_{S,2}^* x_{2n}^* \end{bmatrix} + \tilde{V}_{R,n},$$

where the (2N×2N) sized matrix $\tilde{V}_{R,n}$ is given by $$\tilde{V}_{R,n} = \begin{bmatrix} v_{v,1,2n} & v_{R,1,2n+1} \\ \zeta(v_{R,2,2n+1}^*) & -\zeta(v_{R,2,2n}^*) \end{bmatrix}.$$

Step 209 further comprises steps 210 and 212.

In step 210, for those elements of $Y_R$ where no signal conjugation is needed e.g.: for $y_{11,R}$ and $y_{12,R}$, nothing needs to be done.

In step 212, for those elements of $Y_R$ where signal conjugation is needed e.g.: for $y_{21,R}$ and $y_{22,R}$, the OFDM symbol sequence is reordered using a mapping function $\zeta(\bullet)$:

$$\zeta(a) = [a(N-1), a(N-2), \ldots, a(0)]^T,$$

the (N×1) sized input vector $a=[a(0), a(1), \ldots, a(N-1)]^T$. This function can be easily implemented in hardware by storing the signal samples in a shift register and then reading the register in reverse order. This represents a significant advantage because reordering operations that are more complex than mere reversal, such as the insertion, deletions and swapping of signal samples do not have to be done.

It can be shown that $$\zeta([H_{S,i} W_N^H x_j]^*) = \zeta(H_{S,i}^* (W_N^H x_j)^*)$$
$$= \zeta(H_{S,i}^*)(W_N^H x_j)^*$$
$$= W_N^H Z_N\left(\frac{2\pi}{N}\right) \Lambda_{S,i}^* T W_N W_N^H T x_j^*$$
$$= W_N^H Z_N\left(\frac{2\pi}{N}\right) \Lambda_{S,i}^* T T x_j^*$$
$$= W_N^H Z_N\left(\frac{2\pi}{N}\right) \Lambda_{S,i}^* x_j^*$$

for $j = 2n, 2n+1$ and $i = 1, 2$.

where matrix $Z_N(\Phi)$ denotes a (N×N) diagonal matrix given by $$Z_N(\Phi) = \text{diag}([1, e^{j\Phi}, e^{j2\Phi}, \ldots, e^{j(N-1)\Phi}]^T).$$

and T is a (N×N) permutation matrix such that $$T = [\zeta(I_N)]^{(1)} \text{ and } TT = I_N.$$

$I_N$ is an identity matrix of size N. The operator $[\bullet]^*$ represents a complex conjugation.

The notation $[a]^{(l)}$ denotes the circular shifting of vector a by l elements, where $$[a]^{(2)} = [a(N-2), a(N-1), a(0), a(1), \ldots, a(N-3)]^T.$$

For a given matrix X, matrix $[X]^{(l)}$ is obtained by circular shifting each column vector of X by l elements.

In step 213, a second cyclic prefix (denoted $CP_{ij,2}$) with length $P_2$ where $P_2=L_2-1$ is obtained for each $y_{ij,R}$. $L_2$ is the length of the CIRs denoted by the vectors $h_{1,D}$ and $h_{2,D}$ respectively for the channel between the first antenna of the relay station and the destination, and the channel between the second antenna of the relay station and the destination. Each of the cyclic prefixes $CP_{ij,2}$ is derived from the corresponding $y_{ij,R}$. The cyclic prefixes $CP_{ij,2}$ are then inserted in front of $y_{ij,R}$ to produce the symbol sequences $\lfloor CP_{ij,2}\ y_{ij,R} \rfloor$. It is to be noted that $y_{ij,R}$ is a (N×1) sized vector.

In step 214, the other necessary steps for the ASTC implementation at the relay station are performed. The symbol sequences $\lfloor CP_{ij,2}\ y_{ij,R} \rfloor$ are then transmitted by the i-th relay antenna during the j-th OFDM symbol duration, where i=1, 2 and j={2n, 2n+1}. The transmission from the relay station to destination takes place in the second phase of the transmission cycle where the source remains silent.

In step 216, after frame synchronization, the destination removes the cyclic prefix of length $P_2$ from each OFDM symbol received. The OFDM symbol with the cyclic prefix removed can be denoted by the (N×1) signal vector $r_{D,j}$ for each j-th OFDM symbol duration.

Assuming that ACFO is present and ACFO compensation was done at the relay, for the j={2n, 2n+1}-th OFDM symbol duration, the (N×1) received signal vectors at the destination in the presence of ACFO $\Phi_d$ are given by $$r_{D,2n} = \frac{e^{j(2n(N+P_2)+P_2)\phi_d}}{\sqrt{2}} Z_N(\phi_d) \quad \text{CP Scheme 1}$$
$$[H_{1,D}H_{S,1}W_N^H x_{2n} + H_{2,D}\zeta(H_{S,2}^*)W_N^H T x_{2n+1}^*] + p_{D,2n}$$

$$r_{D,2n+1} = \frac{e^{j((2n+1)(N+P_2)+P_2)\phi_d}}{\sqrt{2}} Z_N(\phi_d)[H_{1,D}H_{S,1}W_N^H x_{2n+1} -$$
$$H_{2,D}\zeta(H_{S,2}^*)W_N^H T x_{2n}^*] + p_{D,2n+1},$$

where the noise vectors are given by $$p_{D,2n} = \frac{e^{j(2n(N+P_2)+P_2)\phi_d}}{\sqrt{2}} Z_N(\phi_d)[H_{1,D}v_{R,1,2n} + H_{2,D}\zeta(v_{R,2,2n+1}^*)] + v_{D,2n}$$

$$p_{D,2n+1} = \frac{e^{j((2n+1)(N+P_2)+P_2)\phi_d}}{\sqrt{2}} Z_N(\phi_d)[H_{1,D}v_{R,1,2n+1} - H_{2,D}\zeta(v_{R,2,2n}^*)] + v_{D,2n+1}.$$

Optionally, ACFO $\Phi_d$ compensation can be performed at the destination as step 240.

Assuming that ACFO is present and no ACFO compensation was done at the relay, for the j={2n, 2n+1}-th OFDM symbol duration, $$r_{D,2n} = e^{j(2n(N+P_2)+P_2)\phi_d} Z_N(\phi_d)$$
$$\left[ e^{j(2n(N+P_1)+P_1)\phi_r} H_{1,D} Z_N(\phi_r) W_N^H \Lambda_{S,1} x_{2n} + e^{-j((2n+1)(N+P_1)+P_1+N-1)\phi_r} \right.$$
$$\left. H_{2,D} Z_N(\phi_r) W_N^H Z_N\left(\frac{2\pi}{N}\right) \Lambda_{S,2}^* x_{2n+1}^* \right] + p_{D,2n}$$

$$r_{D,2n+1} = e^{j((2n+1)(N+P_2)+P_2)\phi_d} Z_N(\phi_d)\left[ e^{j((2n+1)(N+P_1)+P_1)\phi_r} H_{1,D} \right.$$

-continued
$$\left. Z_N(\phi_r) W_N^H \Lambda_{S,1} x_{2n+1} - e^{-j(2n(N+P_1)+P_1+N-1)\phi_r} \right.$$
$$\left. H_{2,D} Z_N(\phi_r) W_N^H Z_N\left(\frac{2\pi}{N}\right) \Lambda_{S,2}^* x_{2n}^* \right] + p_{D,2n+1}.$$

$H_{1,D}$ and $H_{2,D}$ are (N×N) circulant matrices respectively with $[h_{1,D}^T, 0_{1\times(N-L)}]^T$ and $[h_{2,D}^T, 0_{1\times(N-L)}]^T$ as their first column vectors. The (N×1) vector $p_{D,2n}$ represent additive noise.

Assuming that ACFO compensation was performed, or if ACFO is absent, for the j=(2n)-th OFDM symbol duration $$r_{D,2n} = H_{1,D} W_N^H \Lambda_{S,1} x_{2n} + H_{2,D} W_N^H Z_N\left(\frac{2\pi}{N}\right) \Lambda_{S,2}^* x_{2n+1}^* + p_{D,2n},$$

The (N×1) vector $p_{D,2n}$ representing the additive noise is given by $$p_{D,2n} = H_{1,D} v_{R,1,2n} + H_{2,D} \zeta(v_{R,2,2n+1}^*) + v_{D,2n},$$

where the (N×1) vector $v_{D,2n}$ contains the N samples of AWGN at destination with covariance matrix $$E[v_{D,2n} v_{D,2n}^H] = \sigma_D^2 I_N.$$

Similarly, for the j=(2n+1)-th OFDM symbol duration, $$r_{D,2n+1} = H_{1,D} W_N^H \Lambda_{S,1} x_{2n+1} - H_{2,D} W_N^H Z_N\left(\frac{2\pi}{N}\right) \Lambda_{S,2}^* x_{2n}^* + p_{D,2n+1}$$

$$p_{D,2n+1} = H_{1,D} v_{R,1,2n+1} - H_{2,D} \zeta(v_{R,2,2n}^*) + v_{D,2n+1}.$$

In step 218, the destination performs ASTC decoding in the frequency domain using the channel state information (CSI) parameters that were obtained during training. N-point DFTs are performed on the signal vector $r_{D,j}$ for the symbol durations j={2n, 2n+1}. Assuming that ACFO is absent, the N-point DFT of $r_{D,2n}$ is $$W_N r_{D,2n} = \Lambda_{1,D} \Lambda_{S,1} x_{2n} + \Lambda_{2,D} Z_N\left(\frac{2\pi}{N}\right) \Lambda_{S,2}^* x_{2n+1}^* + W_N p_{D,2n}.$$

Similarly, the N-point DFT of the signal vector received by the destination during the (2n+1)-th OFDM symbol duration (i.e. $r_{D,2n+1}$) is given by $$W_N r_{D,2n+1} = \Lambda_{1,D} \Lambda_{S,1} x_{2n+1} - \Lambda_{2,D} Z_N\left(\frac{2\pi}{N}\right) \Lambda_{S,2}^* x_{2n}^* + W_N p_{D,2n+1}$$

A (2N×1) vector $y_{D,n}$ is constructed as $$y_{D,n} = [(W_N r_{D,2n})^T, (W_N r_{D,2n+1})^H]^T$$
$$= H_P \begin{bmatrix} x_{2n} \\ x_{2n+1}^* \end{bmatrix} + \begin{bmatrix} W_N p_{D,2n} \\ (W_N p_{D,2n+1})^* \end{bmatrix}.$$

Estimates of $x_{2n}$ and $x_{2n+1}$ (denoted $\tilde{x}_{2n}$ and $\tilde{x}_{2n+1}$) can be obtained using the conjugate transpose of $H_P$ i.e. $H_P^H$ $$\begin{bmatrix} \tilde{x}_{2n} \\ \tilde{x}^*_{2n+1} \end{bmatrix} = H_P^H y_{D,n}$$

$$= H_P^H \begin{bmatrix} W_N r_{D,2n} \\ (W_N r_{D,2n+1})^* \end{bmatrix}$$

$H_P$ is the (2N×2N) sized product channel matrix and is given by $$H_P = \begin{bmatrix} \Lambda_{1,D}\Lambda_{S,1} & Z_N\left(\frac{2\pi}{N}\right)\Lambda_{2,D}\Lambda^*_{S,2} \\ -Z_N\left(-\frac{2\pi}{N}\right)\Lambda^*_{2,D}\Lambda_{S,2} & \Lambda^*_{1,D}\Lambda^*_{S,1} \end{bmatrix}.$$

The product channel matrix $H_P$ is a known parameter obtained during the product channel matrix estimation and forms part of the channel state information (CSI). $H_P$ allows for a simple linear decoding at destination, since $$H_P^H H_P = I_2 \otimes (|\Lambda_{1,D}|^2|\Lambda_{S,1}|^2 + |\Lambda_{2,D}|^2|\Lambda_{S,2}|^2).$$

where $\otimes$ denotes performing a Kronecker product.

In step 230, the relay station optionally performs ACFO $\Phi_r$ compensation. The signal vectors $r_{R,i,j}$ received over the span of 2 OFDM symbol durations j={2n, 2n+1} for antennae i=1, 2 are:

$$\begin{bmatrix} r_{R,1,2n} & r_{R,1,2n+1} \\ r_{R,2,2n} & r_{R,2,2n+1} \end{bmatrix} =$$

$$\begin{bmatrix} e^{j(2n(N+P_1)+P_1)\phi_r} Z_N(\phi_r) H_{S,1} W_N^H x_{2n} & e^{j((2n+1)(N+P_1)+P_1)\phi_r} Z_N(\phi_r) H_{S,1} W_N^H x_{2n+1} \\ e^{j(2n(N+P_1)+P_1)\phi_r} Z_N(\phi_r) H_{S,2} W_N^H x_{2n} & e^{j((2n+1)(N+P_1)+P_1)\phi_r} Z_N(\phi_r) H_{S,2} W_N^H x_{2n+1} \end{bmatrix} + \begin{bmatrix} v_{R,1,2n} & v_{R,1,2n+1} \\ v_{R,2,2n} & v_{R,2,2n+1} \end{bmatrix}$$

Figure 4:
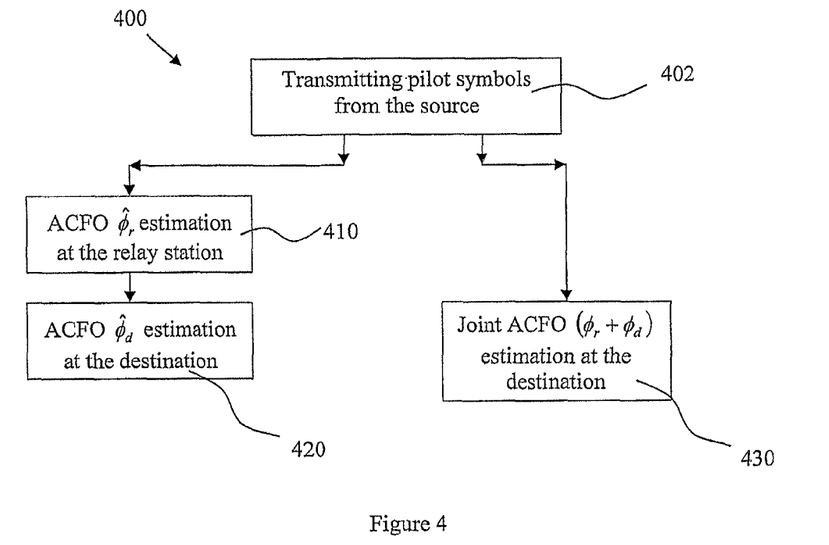
FIG. 4 is a flow diagram of a method for performing channel estimation according to the example embodiment.

The ACFO $\Phi_r$ is a known parameter obtained at the relay station during the ACFO $\hat{\Phi}_r$ estimation step 410 and forms part of the channel state information (CSI).

The effect of the ACFO $\Phi_r$ can be removed for $r_{R,1,2n}$ and $r_{R,2,2n}$ by multiplying $r_{R,1,2n}$ and $r_{R,2,2n}$ with the conjugate of $e^{j(2n(N+P_1)+P_1)\Phi_r} Z_N(\Phi_r)$. The effect of the ACFO $\Phi_r$ can be removed for $r_{R,1,2n+1}$ and $r_{R,2,2n+1}$ by multiplying $r_{R,1,2n+1}$ and $r_{R,2,2n+1}$ with the conjugate of $e^{j((2n+1)(N+P_1)+P_1)\Phi_r} Z_N(\Phi_r)$.

In step 240, the destination optionally performs ACFO $\Phi_d$ compensation. The (N×1) received signal vectors at the destination in the presence of ACFO $\Phi_d$ are given by $$r_{D,2n} = \frac{e^{j(2n(N+P_2)+P_2)\phi_d}}{\sqrt{2}} Z_N(\phi_d) \qquad \text{CP Scheme 1}$$

$$[H_{1,D} H_{S,1} W_N^H x_{2n} + H_{2,D}\zeta(H^*_{S,2}) W_N^H T x^*_{2n+1}] + p_{D,2n}$$

$$r_{D,2,+1} = \frac{e^{j((2n+1)(N+P_2)+P_2)\phi_d}}{\sqrt{2}} Z_N(\phi_d)[H_{1,D} H_{S,1} W_N^H x_{2n+1} -$$

$$H_{2,D}\zeta(H^*_{S,2}) W_N^H T x^*_{2n}] + p_{D,2n+1},$$

where the noise vectors are given by $p_{D,2n}$ and $p_{D,2n+1}$. The ACFO $\Phi_d$ is a known parameter obtained at the destination during the ACFO $\hat{\Phi}_d$ estimation step 420 and forms part of the channel state information (CSI).

The effect of the ACFO $\Phi_d$ can be removed by multiplying $r_{D,2n}$ and $r_{D,2n+1}$ respectively with the conjugate of $e^{j(2n(N+P_2)+P_2)\Phi_d} Z_N(\Phi_d)$ and $e^{j((2n+1)(N+P_2)+P_2)\Phi_d} Z_N(\Phi_d)$.

The Cyclic Prefix Scheme 1 may have the advantage that only analog domain processing has to be done at the relay, and only linear processing has to be done for maximum likelihood decoding at the destination.

Cyclic Prefix Scheme 2

Figure 3:
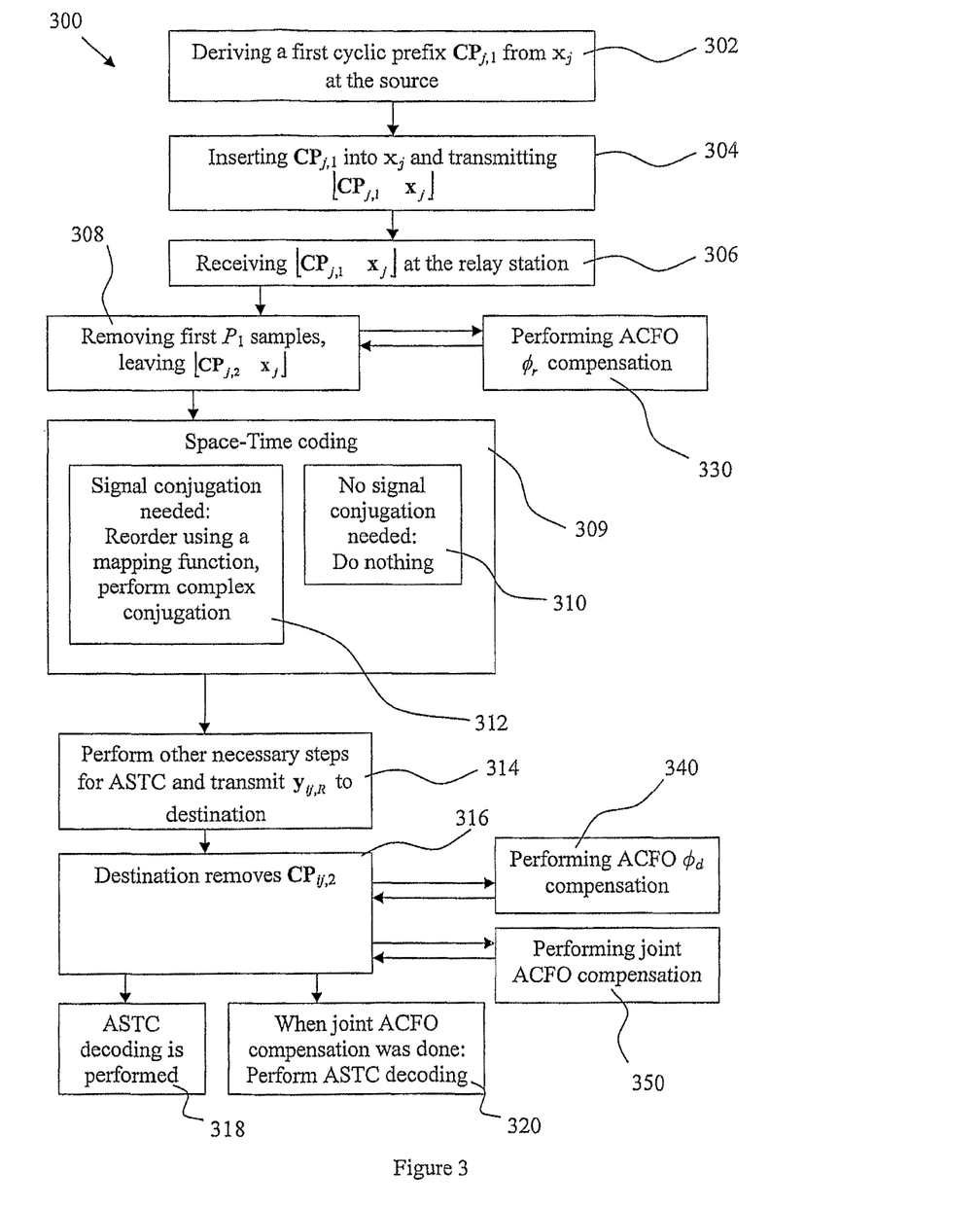
FIG. 3 is a flow diagram of a scheme for inserting cyclic prefixes according to a Cyclic Prefix Scheme 2 of the example embodiment.

FIG. 3 shows an alternative scheme for inserting cyclic prefixes according to the example embodiment. Let $x_j$ be a (N×1) vector containing the N data symbols to be transmitted during a j-th OFDM symbol duration.

While this example embodiment of the invention has been described using 2 OFDM symbols i.e. $x_{2n}$ and $x_{2n+1}$, it is clear that the use of a different number of OFDM symbols is possible within the scope of the invention, as will be clear to a skilled reader.

In step 302, the source derives a first cyclic prefix (denoted $CP_{j,1}$) with length P from $x_j$, where $P=P_1+P_2=L_1+L_2-2$. $L_1$ is the length of the channel impulse response (CIR) represented by $h_{S,1}$ and $h_{S,2}$ respectively for the channel between the source 110 and the first antenna 122 of the relay station 120, and the channel between the source 110 and the second antenna 124 of the relay station 120. $L_2$ is the length of the CIRs denoted by the vectors $h_{1,D}$ and $h_{2,D}$ respectively for the channel between the first antenna 122 of the relay station 120 and the destination 130, and the channel between the second antenna 124 of the relay station 120 and the destination 130.

In step 304, the source inserts $CP_{j,1}$ in front of $x_j$ and then transmits the resultant symbol sequence.

Let the symbol sequence $x_j$ consist of N symbols be denoted by $x_n$ where n=0 . . . N−1, i.e.

$$x_j = [x_0 \ldots x_n \ldots x_{N-1}]$$

The cyclic prefix $CP_{j,1}$ of length $P_1$ is created by copying the last Ncp words of $x_j$ $$CP_{j,1} = [x_{N-P_1} \ldots x_{N-2} x_{N-1}]$$

The cyclic prefix $CP_{j,1}$ is inserted in front of $x_j$, producing the resultant symbol sequence $\lfloor CP_{j,1} \ x_j \rfloor$ for transmission.

The transmission from the source 110 to relay station 120 takes place in the first phase of the transmission cycle.

In step 306, the relay station receives $\lfloor CP_{j,1} \ x_j \rfloor$ at both antennae of the station.

In step 308, after performing time synchronization, the first $P_1$ samples of the $CP_{j,1}$ portion of each OFDM symbol is removed, leaving a sequence represented by $\lfloor CP_{j,2} \ x_j \rfloor$. The first $P_1$ samples of each OFDM symbol are distorted by the ISI induced by the frequency selective fading occurring at the source to relay channels. The resulting OFDM symbol will then have (N+$P_2$) samples. Should ACFO be present, the signal vectors received over the span of 2 OFDM symbol durations i.e. for j={2n, 2n+1} are given after the removal of $CP_{j,1}$ as $$\begin{bmatrix} \tilde{r}_{R,1,2n} & \tilde{r}_{R,1,2n+1} \\ \tilde{r}_{R,2,2n} & \tilde{r}_{R,2,2n+1} \end{bmatrix} =$$

$$\begin{bmatrix} e^{j(2n(N+P)+P_1)\phi_r} Z_{N+P_2}(\phi_r)\tilde{H}_{S,1}W_N^H x_{2n} & e^{j((2n+1)(N+P)+P_1)\phi_r} Z_{N+P_2}(\phi_r)\tilde{H}_{S,1}W_N^H x_{2n+1} \\ e^{j(2n(N+P)+P_1)\phi_r} Z_{N+P_2}(\phi_r)\tilde{H}_{S,2}W_N^H x_{2n} & e^{j((2n+1)(N+P)+P_1)\phi_r} Z_{N+P_2}(\phi_r)\tilde{H}_{S,2}W_N^H x_{2n+1} \end{bmatrix} + \begin{bmatrix} \tilde{v}_{R,1,2n} & \tilde{v}_{R,1,2n+1} \\ \tilde{v}_{R,2,2n} & \tilde{v}_{R,2,2n+1} \end{bmatrix}.$$

$\tilde{r}_{R,i,j}$ denotes the $((N+P_2)\times 1)$ received signal vector obtained after the removal of $P_1$ samples, with i and j respectively denoting the antenna index and OFDM symbol duration. n denotes the data transmission cycle index. The (N×N) matrix $W_N^H$ is the inverse discrete Fourier transform (IDFT) matrix. Matrix $\tilde{H}_{S,i}$ for i=1, 2 is a $((N+P_2)\times N)$ matrix given by $$\tilde{H}_{S,i} = \begin{bmatrix} H_{S,i}(N-P_2+1:N,:) \\ H_{S,i} \end{bmatrix},$$

with $H_{S,i}$ being a (N×N) circulant matrix with $[h_{S,i}^T, 0_{1\times(N-L_1)}]^T$ as its first column vector and $H_{S,i}(N-P_2+1:N,:)$ denotes the last $P_2$ row vectors of $H_{S,i}$.

The vector $\tilde{v}_{R,i,j}$ of size $((N+P_2)\times 1)$ contains the AWGN affecting the signal $\tilde{r}_{R,i,j}$. The covariance matrix of the noise vector $\tilde{v}_{R,i,j}$ at the relay station is given by $$E[\tilde{v}_{R,i,j}\tilde{v}_{R,i,j}^H] = \sigma_R^2 I_{N+P_2}$$

Optionally, in the event that ACFO is present, ACFO $\Phi_r$ compensation can be performed at the relay station as Step 330.

Assuming the complete removal of ACFO or if ACFO was absent, over the span of 2 OFDM symbol durations i.e. for j={2n, 2n+1}, the received signal vectors obtained after the removal of the first $P_1$ samples of the $CP_{j,1}$ portion of each OFDM symbol are given as follows:

$$\begin{bmatrix} \tilde{r}_{R,1,2n} & \tilde{r}_{R,1,2n+1} \\ \tilde{r}_{R,2,2n} & \tilde{r}_{R,2,2n+1} \end{bmatrix} = \begin{bmatrix} \tilde{H}_{S,1}W_N^H x_{2n} & \tilde{H}_{S,1}W_N^H x_{2n+1} \\ \tilde{H}_{S,2}W_N^H x_{2n} & \tilde{H}_{S,2}W_N^H x_{2n+1} \end{bmatrix} + \begin{bmatrix} \tilde{v}_{R,1,2n} & \tilde{v}_{R,1,2n+1} \\ \tilde{v}_{R,2,2n} & \tilde{v}_{R,2,2n+1} \end{bmatrix},$$

Step 309 is then performed at the relay station. In step 309, processing is performed in order to implement space-time coding at the carrier level. The matrix $Y_R$ is computed and arranged:

$$Y_R = [y_{ij,R}] = \begin{bmatrix} y_{11,R} & y_{12,R} \\ y_{21,R} & y_{22,R} \end{bmatrix} = \frac{1}{\sqrt{2}} \begin{bmatrix} \tilde{r}_{R,1,2n} & \tilde{r}_{R,1,2n+1} \\ \zeta(\tilde{r}_{R,2,2n+1}^*) & -\zeta(\tilde{r}_{R,2,2n}^*) \end{bmatrix}$$

The operator $[\bullet]^*$ represents a complex conjugation. The space-time code implemented can for example be the Alamouti code.

Step 309 further comprises steps 310 and 312.

In step 310, for those elements of $Y_R$ where no signal conjugation is needed e.g.: for $y_{11,R}$ and $y_{12,R}$, nothing needs to be done.

In step 312, for those elements of $Y_R$ where signal conjugation is needed e.g.: for $y_{21,R}$ and $y_{22,R}$, the OFDM symbol sequence from the respective $\tilde{r}_{R,i,j}$ is reordered using the mapping function $\zeta(\bullet)$:

$$\zeta(a) = [a(N-1), a(N-2), \ldots, a(0)]^T,$$

the (N×1) input vector $a=[a(0), a(1), \ldots, a(N-1)]^T$. This function can be easily implemented in hardware by storing the signal samples in a shift register and then reading the register in reverse order.

The mapping function $\zeta(\bullet)$ can thus be re-expressed as $$\zeta(a(n)) = a(N-n-1)$$

where a(n) denotes the n-th symbol of the OFDM symbol sequence a. A time domain signal conjugation is then performed on each reordered symbol $\zeta(a(n))$, for n=0 . . . N−1.

Let b=$\zeta(a)$. It can be shown that after signal conjugation is done, taking B={B(0) . . . B(k) . . . B(N−1)} to be the corresponding frequency domain sequence of b $$B^*(k)W_N^{k(N-P_2-1)} = B^*(k)W_N^{-k(P_2+1)}$$

i.e., the phase-shifted conjugate sequence.

The following Discrete Fourier Transform (DFT) properties are present:
Linearity: $ax(n)+by(n) \Leftrightarrow aX(k)+bY(k)$;
Cyclic Shift $x((n+m)_N) \Leftrightarrow W_N^{-km}X(k)$;
Symmetry $x^*((-n)_N) \Leftrightarrow X^*(k)$ x(n) and y(n) to denote the time domain sequence, X(k) and Y(k) their corresponding frequency domain sequence, N the DFT size, and $$W_N = \exp\left(-j\frac{2\pi}{N}\right).$$

In step 314, the other necessary steps for the ASTC implementation at the relay station are performed. The symbol sequences contained in $$Y_R = [y_{ij,R}] = \begin{bmatrix} y_{11,R} & y_{12,R} \\ y_{21,R} & y_{22,R} \end{bmatrix}$$

are then transmitted by the i-th relay antenna during the j-th OFDM symbol duration, where i=1, 2 and j={2n, 2n+1}. The transmission from the relay station to destination takes place in the second phase of the transmission cycle where the source remains silent.

In step 316, after frame synchronization, the destination removes the cyclic prefix of length $P_2$ from each OFDM symbol received. Each OFDM symbol after cyclic prefix removal will be N samples long and can be denoted by the signal vector $r_{D,j}$ for each j-th OFDM symbol duration.

Assuming that ACFO is present and ACFO compensation was done at the relay, for the j={2n, 2n+1}-th OFDM symbol duration, the (N×1) received signal vectors at the destination in the presence of ACFO $\Phi_d$ are given by $r_{D,2n} =$                                               CP Scheme 2

$$\frac{e^{j(2n(N+P_2)+P_2)\phi_d}}{\sqrt{2}} Z_N(\phi_d)[H_{1,D}H_{S,1}W_N^H x_{2n} + H_{2,D}G_{S,2}$$

-continued
$$r_{D,2n+1} = \frac{e^{j((2n+1)(N+P_2)+P_2)\phi_d}}{\sqrt{2}} Z_N(\phi_d)[H_{1,D}H_{S,1}W_N^H x_{2n+1} -$$
$$H_{2,D}G_{S,2}W_N^H Tx_{2n}^*] + \tilde{p}_{D,2n+1},$$

where the noise vectors are given by $$\tilde{p}_{D,2n} = \frac{e^{j(2n(N+P_2)+P_2)\phi_d}}{\sqrt{2}} Z_N(\phi_d)R_{cp}[U_{1,D}\tilde{v}_{R,1,2n} + U_{2,D}\zeta(\tilde{v}_{R,2,2n+1}^*)] + v_{D,2n}$$

$$\tilde{p}_{D,2n+1} = \frac{e^{j((2n+1)(N+P_2)+P_2)\phi_d}}{\sqrt{2}} Z_N(\phi_d)R_{cp}[U_{1,D}\tilde{v}_{R,1,2n+1} - H_{2,D}\zeta(\tilde{v}_{R,2,2n}^*)] + v_{D,2n+1}.$$

Optionally, ACFO $\Phi_d$ compensation can be performed at the destination as step 340.

Assuming that ACFO is present and no ACFO compensation was done at the relay, for the j={2n, 2n+1}-th OFDM symbol duration, $$r_{D,2n} = e^{j(2n(N+P_2)+P_2)(\phi_d+\phi_r)}$$
$$Z_N(\phi_d+\phi_r)[\alpha_n \check{H}_{1,D}H_{S,1}W_N^H x_{2n} + \gamma_n \check{H}_{2,D}G_{S,2}(W_N^H x_{2n+1})^*] + \tilde{p}_{D,2n}$$

$$r_{D,2n+1} = e^{j((2n+1)(N+P_2)(\phi_d+\phi_r)}Z_N(\phi_d+\phi_r)[\alpha_n e^{jP_1\phi_r}\check{H}_{1,D}H_{S,1}W_N^H x_{2n+1} -$$
$$\gamma_n e^{jP_1\phi_r}\check{H}_{2,D}G_{S,2}(W_N^H x_{2n})^*] + \tilde{p}_{D,2n+1},$$

where $\check{H}_{1,D}$ and $\check{H}_{2,D}$ are (N×N) circulant matrix with $Z_N(-\Phi_r)[h_{1,D}^T, 0_{1\times(N-L_2)}]^T$ and $Z_N(-\Phi_r)[h_{2,D}^T, 0_{1\times(N-L_2)}]^T$ as their respective first column vectors and scalars $\alpha_n$ and $\gamma_n$ are defined as follows:

$$\alpha_n = e^{j(2n+1)P_1\Phi_r}$$

$$\gamma_n = e^{-j((4n+2)(N+P)-2nP_1-1)\Phi_r}.$$

Optionally, joint ACFO compensation can be performed at the destination as step 350 to compensate for the ACFO $\Phi_r$ and $\Phi_d$.

Assuming that ACFO compensation was performed, or if ACFO is absent, for the j=(2n)-th OFDM symbol duration $$r_{D,2n} = H_{1,D}H_{S,1}W_N^H x_{2n} + H_{2,D}G_{S,2}(W_N^H x_{2n+1})^* + \tilde{p}_{D,2n},$$

The (N×N) matrix $G_{S,2}$ is given by $$G_{S,2} = \zeta(\tilde{H}_{S,2}(1:N,:)).$$

The mapping $\zeta(\cdot)$ for a 2-dimensional matrix A is computed as follows: Given that A has a size of $(N_1 \times N_2)$ and $A=[a_1, a_2, \ldots, a_{N_2}]$ where $a_i$ is $(N_1 \times 1)$ vector for $i=1, 2, \ldots, N_2$, then $\zeta(A)=[\zeta(a_1), \zeta(a_2), \ldots, \zeta(a_{N_2})]$.

The (N×1) vector $\tilde{p}_{D,2n}$ is given by $$\tilde{p}_{D,2n} = R_{cp}[U_{1,D}\tilde{v}_{R,1,2n} + U_{2,D}\zeta(\tilde{v}_{R,2,2n+1}^*)] + v_{D,2n},$$

where vector $v_{D,2n}$ contains the AWGN received at the destination for i=1, 2, the matrix $U_{i,D}$ is a $((N+P_2)\times(N+P_2))$ Toeplitz matrix with $[h_{i,D}^T, 0_{1\times(N+P_2-L_2)}]^T$ as its first column vector and $[h_{i,D}(1,1), 0_{1\times(N+P_2-1)}]$ as its first row vector. Matrix $R_{cp}$ is a $(N\times(N+P_2))$ matrix defined as $$R_{cp} = [0_{N\times P_2}, I_N].$$

Similarly, the (N×1) sized signal vector received at the destination during (2n+1)th OFDM symbol duration is obtained to be $$r_{D,2n+1} = H_{1,D}H_{S,1}W_N^H x_{2n+1} - H_{2,D}G_{S,2}(W_N^H x_{2n})^* + \tilde{p}_{D,2n+1},$$

$$\tilde{p}_{D,2n+1} = R_{cp}[U_{1,D}\tilde{v}_{R,1,2n+1} - U_{2,D}\zeta(\tilde{v}_{R,2,2n}^*)] + v_{D,2n+1}.$$

In step 318, the destination performs the ASTC decoding in the frequency domain using the channel state information (CSI) parameters that were obtained during training. N-point DFTs are performed on the signal vector $r_{D,j}$ for the symbol durations j={2n, 2n+1}, resulting in the vectors $W_N r_{D,2n}$ and $W_N r_{D,2n+1}$ A (2N×1) vector $y_{D,n}$ is constructed as $$y_{D,n} = [(W_N r_{D,2n})^T, (W_N r_{D,2n+1})^H]^T$$
$$= H_P \begin{bmatrix} x_{2n} \\ x_{2n+1}^* \end{bmatrix} + \begin{bmatrix} W_N \tilde{p}_{D,2n} \\ (W_N \tilde{p}_{D,2n+1})^* \end{bmatrix}$$

The signals $r_{D,2n}$ and $r_{D,2n+1}$ can be represented as $$r_{D,2n} = H_{1,D}H_{S,1}W_N^H x_{2n} + H_{2,D}G_{S,2}(W_N^H x_{2n+1})^* + \tilde{p}_{D,2n},$$

$$r_{D,2n+1} = H_{1,D}H_{S,1}W_N^H x_{2n+1} - H_{2,D}G_{S,2}(W_N^H x_{2n})^* + \tilde{p}_{D,2n+1},$$

The matrix $G_{S,2}$ is defined to be a (N×N) matrix of the form:

$$G_{S,2} = \zeta(\tilde{H}_{S,2}^*(1:N,:)).$$

It can be observed that matrix $G_{S,2}$ can be obtained by permutating the column vectors of a (N×N) circulant matrix $C_{S,2} = W_N^H \Lambda_{S,2}^* W_N$. Using this knowledge, it can be shown that $$G_{S,2} = W_N^H \left[\left(Z_N\left(\frac{2\pi}{N}\right)\right)^{L_2} \Lambda_{S,2}^* T\right] W_N.$$

Substituting $G_{S,2}$ in the (N×1)-sized vector $H_{2,D}G_{S,2}(W_N^H x_{2n+1})^*$, $$H_{2,D}G_{S,2}(W_N^H x_{2n+1})^* = W_N^H \Lambda_{2,D}(W_N G_{S,2} W_N^H)W_N(W_N^H x_{2n+1})^*$$
$$= W_N^H \Lambda_{2,D}\left(\left(Z_N\left(\frac{2\pi}{N}\right)\right)^{L_2} \Lambda_{S,2}^* T\right)W_N(W_N^H x_{2n+1})^*$$
$$= W_N^H \Lambda_{2,D}\left(Z_N\left(\frac{2\pi}{N}\right)\right)^{L_2} \Lambda_{S,2}^* TTx_{2n+1}^*$$
$$= W_N^H \left(Z_N\left(\frac{2\pi}{N}\right)\right)^{L_2} \Lambda_{2,D}\Lambda_{S,2}^* x_{2n+1}^* \text{ since } TT = I_N.$$

Similarly, the (N×1) vector $H_{2,D}G_{S,2}(W_N^H x_{2n})^*$ can be expressed as $$H_{2,D}G_{S,2}(W_N^H x_{2n})^* = W_N^H \left(Z_N\left(\frac{2\pi}{N}\right)\right)^{L_2} \Lambda_{2,D}\Lambda_{S,2}^* x_{2n}^*.$$

Substituting the expressions of $H_{2,D}G_{S,2}(W_N^H x_{2n+1})^*$ and $H_{2,D}G_{S,2}(W_N^H x_{2n})^*$ into $y_{D,n}$, $$y_{D,n} = [(W_N r_{D,2n})^T, (W_N r_{D,2n+1})^H]^T$$

-continued $$= \begin{bmatrix} \Lambda_{1,D}\Lambda_{S,1} & \left(Z_N\left(\frac{2\pi}{N}\right)\right)^{L_2}\Lambda_{2,D}\Lambda_{S,2}^* \\ -\left(Z_N\left(-\frac{2\pi}{N}\right)\right)^{L_2}\Lambda_{2,D}^*\Lambda_{S,2} & \Lambda_{1,D}^*\Lambda_{S,1}^* \end{bmatrix}\begin{bmatrix} x_{2n} \\ x_{2n+1}^* \end{bmatrix} +$$

$$\begin{bmatrix} W_N p_{D,2n} \\ (W_N p_{D,2n+1})^* \end{bmatrix}.$$

Estimates of $x_{2n}$ and $x_{2n+1}$ (denoted $\tilde{x}_{2n}$ and $\tilde{x}^*_{2n+1}$) can be obtained using the conjugate transpose of $H_P$ i.e. $H_P^H$ $$\begin{bmatrix} \tilde{x}_{2n} \\ \tilde{x}_{2n+1}^* \end{bmatrix} = H_P^H y_{D,n}$$

$$= H_P^H \begin{bmatrix} W_N r_{D,2n} \\ (W_N r_{D,2n+1})^* \end{bmatrix}$$

$H_P$ is the (2N×2N) sized product channel matrix and is given by $$H_P = \begin{bmatrix} \Lambda_{1,D}\Lambda_{S,1} & \left(Z_N\left(\frac{2\pi}{N}\right)\right)^{L_2}\Lambda_{2,D}\Lambda_{S,2}^* \\ -\left(Z_N\left(-\frac{2\pi}{N}\right)\right)^{L_2}\Lambda_{2,D}^*\Lambda_{S,2} & \Lambda_{1,D}^*\Lambda_{S,1}^* \end{bmatrix}$$

The product channel matrix $H_p$ is a known parameter obtained during the product channel matrix estimation and forms part of the channel state information (CSI). $H_P$ allows for a simple linear decoding at destination, since $$H_P^H H_P = I_2 \otimes (|\Lambda_{1,D}|^2|\Lambda_{S,1}|^2 + |\Lambda_{2,D}|^2|\Lambda_{S,2}|^2).$$

where $\otimes$ denotes performing a Kronecker product.

It can be seen that the present embodiment has an advantage in that there is no need for any sample reordering to be done at the destination.

In the event that ACFO is present and joint ACFO compensation was done in step 316, the ASTC decoding in the frequency domain can be performed using step 320 instead of step 318.

In step 320, the (2N×1) vector $y_{D,n}$ will be $$y_{D,n} = \left[\left(e^{-j(2n(N+P_2)+P_2)(\phi_f)}\right)^T W_N Z_N^H(\phi_f) r_{D,2n}\right)^T,$$

$$\left(e^{-j(2n+1)(N+P_2)+P_2)(\phi_f)} W_N Z_N^H(\phi_f) r_{D,2n+1}\right)^{H}\right]^T$$

$$= \begin{bmatrix} \alpha_n \breve{\Lambda}_{1,D}\Lambda_{S,1} & \gamma_n\left(Z_N\left(\frac{2\pi}{N}\right)\right)^{L_2}\breve{\Lambda}_{2,D}\Lambda_{S,2}^* \\ \gamma_n^* e^{-jP_1\phi_r}\left(Z_N\left(-\frac{2\pi}{N}\right)\right)^{L_2}\breve{\Lambda}_{2,D}^*\Lambda_{S,2} & \alpha_n^* e^{-jP_1\phi_r}\breve{\Lambda}_{1,D}^*\Lambda_{S,1}^* \end{bmatrix}$$
$$\underbrace{\phantom{XXXXXXXXXXXXXXXXXXXXXXXXXXXXXXXXXXXXXX}}_{\tilde{H}_P}$$

$$\begin{bmatrix} x_{2n} \\ x_{2n+1}^* \end{bmatrix} +$$

$$\underbrace{\begin{bmatrix} e^{-j(2n(N+P_2)+P_2)(\phi_f)} W_N Z_N^H(\phi_f)\tilde{p}_{D,2n} \\ e^{-j(2n+1)(N+P_2)+P_2)(\phi_f)} W_N Z_N^H(\phi_f)\tilde{p}_{D,2n+1} \end{bmatrix}}_{a_n}$$

$$y_{D,n} = \tilde{H}_F \begin{bmatrix} x_{2n} \\ x_{2n+1}^* \end{bmatrix} + a_n$$

The scalars $\alpha_n$ and $\gamma_n$ are defined as:

$$\alpha_n = e^{j(2n+1)P_1\Phi_r}$$

$$\gamma_n = e^{-j((4n+2)(N+P)-2nP_1-1)\Phi_r}.$$

where $\Phi_r$ represents the ACFO $\Phi_r$. The value of $\Phi_r$ can be estimated at the relay using the ACFO $\hat{\Phi}_r$ estimation step 410 and then forwarded to the destination.

Estimates of $x_{2n}$ and $x_{2n+1}$ (denoted $\tilde{x}_{2n}$ and $\tilde{x}^*_{2n+1}$) can thus be obtained using $\tilde{H}_F$ such that $$\begin{bmatrix} \tilde{x}_{2n} \\ \tilde{x}_{2n+1}^* \end{bmatrix} = \tilde{H}_F^H y_{D,n}.$$

$\tilde{H}_F^H$ represents the conjugate transpose of $\tilde{H}_F$. $\tilde{H}_F$ has the property that $$\tilde{H}_F^H \tilde{H}_F = I_2 \otimes (|\breve{\Lambda}_{1,D}|^2|\Lambda_{S,1}|^2 + |\breve{\Lambda}_{2,D}|^2|\Lambda_{S,2}|^2).$$

where $\otimes$ denotes performing a Kronecker product. $\tilde{H}_F$ thus allows for a simple linear decoding at the destination.

In step 330, the relay station optionally performs ACFO $\Phi_r$ compensation. The signal vectors $\tilde{r}_{R,i,j}$ received over the span of 2 OFDM symbol durations $j=\{2n, 2n+1\}$ for antennae $i=1, 2$ are:

$$\begin{bmatrix} \tilde{r}_{R,1,2n} & \tilde{r}_{R,1,2n+1} \\ \tilde{r}_{R,2,2n} & \tilde{r}_{R,2,2n+1} \end{bmatrix} = \begin{bmatrix} e^{j(2n(N+P)+P_1)\phi_r}Z_{N+P_2}(\phi_r)\tilde{H}_{S,1}W_N^H x_{2n} & e^{j((2n+1)(N+P)+P_1)\phi_r}Z_{N+P_2}(\phi_r)\tilde{H}_{S,1}W_N^H x_{2n+1} \\ e^{j(2n(N+P)+P_1)\phi_r}Z_{N+P_2}(\phi_r)\tilde{H}_{S,2}W_N^H x_{2n} & e^{j(2n+1(N+P)+P_1)\phi_r}Z_{N+P_2}(\phi_r)\tilde{H}_{S,2}W_N^H x_{2n+1} \end{bmatrix} +$$

$$\begin{bmatrix} \tilde{v}_{R,1,2n} & \tilde{v}_{R,1,2n+1} \\ \tilde{v}_{R,2,2n} & \tilde{v}_{R,2,2n+1} \end{bmatrix}.$$

The ACFO $\Phi_r$ is a known parameter obtained at the relay station during the ACFO $\hat{\Phi}_r$ estimation step 410 and forms part of the channel state information (CSI).

The effect of the ACFO $\Phi_r$ can be removed for $\tilde{r}_{R,1,2n}$ and $\tilde{r}_{R,2,2n}$ by multiplying with the conjugate of $e^{j(2n(N+P_1)+P_1)\Phi_r}Z_N(\Phi_r)$. The effect of the ACFO $\Phi_r$ can be removed for $\tilde{r}_{R,1,2n+1}$ and $\tilde{r}_{R,2,2n+1}$ by multiplying with the conjugate of $e^{j((2n+1)(N+P_1)+P_1)\Phi_r}Z_N(\Phi_r)$.

In step 340, the destination optionally performs ACFO $\Phi_d$ compensation. The (N×1) received signal vectors at the destination in the presence of ACFO $\Phi_d$ are given by CP Scheme 2

$$r_{D,2n} = \frac{e^{j(2n(N+P_2)+P_2)\phi_d}}{\sqrt{2}} Z_N(\phi_d)[H_{1,D}H_{S,1}W_N^H x_{2n} + H_{2,D}G_{S,2}$$

$$W_N^H T x_{2n+1}^*] + \tilde{p}_{D,2n}$$

$$r_{D,2n+1} = \frac{e^{j(2n+1)(N+P_2)+P_2)\phi_d}}{\sqrt{2}} Z_N(\phi_d)[H_{1,D}H_{S,1}W_N^H x_{2n+1} -$$

$$H_{2,D}G_{S,2}W_N^H T x_{2n}^*] + \tilde{p}_{D,2n+1},$$

where the noise vectors are given by $\tilde{p}_{D,2n}$ and $\tilde{p}_{D,2n+1}$. The ACFO $\Phi_d$ is a known parameter obtained during the ACFO $\hat{\Phi}_d$ estimation step 420 and forms part of the channel state information (CSI).

The effect of the ACFO $\Phi_d$ can be removed by multiplying $r_{D,2n}$ and $r_{D,2n+1}$ respectively with the conjugate of $e^{j(2n(N+P_2)+P_2)\Phi_d}Z_N(\Phi_d)$ and $e^{j((2n+1)(N+P_2)+P_2)\Phi_d}Z_N(\Phi_d)$.

In step 350, the destination optionally performs joint ACFO compensation. The (N×1) signal vectors received at the destination for the j={2n, 2n+1}-th OFDM symbol duration are given by $$r_{D,2n} = e^{j(2n(N+P_2)+P_2)(\phi_d+\phi_r)}$$

$$Z_N(\phi_d+\phi_r)\left[\alpha_n\check{H}_{1,D}H_{S,1}W_N^H x_{2n} + \gamma_n\check{H}_{2,D}G_{S,2}(W_N^H x_{2n+1})^*\right] + \tilde{p}_{D,2n}$$

$$r_{D,2n+1} = e^{j((2n+1)(N+P_2)+P_2)(\phi_d+\phi_r)}$$

$$Z_N(\phi_d+\phi_r)\left[\alpha_n e^{jP_1\phi_r}\check{H}_{1,D}H_{S,1}W_N^H x_{2n+1} - \gamma_n e^{jP_1\phi_r}\check{H}_{2,D}G_{S,2}(W_N^H x_{2n})^*\right] + \tilde{p}_{D,2n+1},$$

where the noise vectors are given by $\tilde{p}_{D,2n}$ and $\tilde{p}_{D,2n+1}$.

The scalars $\alpha_n$ and $\gamma_n$ are defined as follows:

$$\alpha_n = e^{j(2n+1)P_1\Phi_r}$$

$$\gamma_n = e^{-j((4n+2)(N+P)-2nP_1)\Phi_r}.$$

It can be seen that ACFO $\Phi_r$ and ACFO $\Phi_d$ are present in the signal vectors $r_{D,2n}$ and $r_{D,2n+1}$. ACFO $\Phi_r$ and ACFO $\Phi_d$ can be added together and be represented by ACFO $\Phi_f$ i.e. $\Phi_f = \Phi_d + \Phi_r$. The ACFO $\Phi_f$ is a known parameter obtained during the joint ACFO ($\Phi_r + \Phi_d$) estimation step 430 and forms part of the channel state information (CSI).

The effect of the ACFO $\Phi_f$ can be removed by multiplying $r_{D,2n}$ and $r_{D,2n+1}$ respectively with the conjugates of $e^{j(2n(N+P_2)+P_2)(\Phi_d+\Phi_r)}Z_N(\Phi_d+\Phi_r)$ and $e^{j((2n+1)(N+P_2)+P_2)(\Phi_d+\Phi_r)}Z_N(\Phi_d+\Phi_r)$.

The Cyclic Prefix Scheme 2 may have the advantage that only analog domain processing has to be done at the relay, and only linear processing has to be done for maximum likelihood decoding at the destination for each carrier.

The Cyclic Prefix Scheme 2 may also be advantageous over the prior art because the relay station does not have to perform time sharing between different sources and destinations. In the prior art, the relay station will need to estimate and compensate the ACFO for each source-and-destination pair as joint ACFO compensation at the destination is not done. This can complicate the relay station hardware and could increase the computational complexity required at the relay station.

Channel Estimation

Channel estimation is performed before actual information is transmitted according to the method shown in the flowchart of FIG. 2 or FIG. 3. The purpose of channel estimation is to obtain a set of Channel State Information (CSI) parameters for use in decoding the signals received at the destination and optionally to compensate for Angular Carrier Frequency Offset (ACFO) at either the relay station or the destination.

Channel estimation according to the example embodiment will be described next with reference to FIG. 4.

In step 402, a simple pair of pilot symbols (or training symbols) is used to estimate the product channel. The pair of pilot symbols comprising of $$[x_{2n}\ x_{2n+1}]$$

is transmitted over two symbol intervals from the source. The pilot symbols are defined as $$x_{2n} = a$$

$$x_{2n+1} = -a$$

where a is a (N×1) vector such that |a(i)|=1 for i=0, 1, ..., N−1 and a has low peak to average power ratio (PAPR). n denotes the data transmission cycle index.

ACFO $\hat{\Phi}_r$ Estimation at the Relay Station

In step 410, ACFO $\hat{\Phi}_r$ estimation is performed at the relay station for either of Cyclic Prefix Schemes 1 or 2. Given the known values of the pilot symbols $[x_{2n}\ x_{2n+1}]$, the ACFO at the relay $\hat{\Phi}_r$ can be easily estimated as $$\hat{\phi}_r = \frac{\angle(-r_{R,1,2n}^H r_{R,1,2n+1}) + \angle(-r_{R,2,2n}^H r_{R,2,2n+1})}{2(N+P)} \quad \text{CP Scheme 1}$$

$$\hat{\phi}_r = \frac{\angle(-\tilde{r}_{R,1,2n}^H \tilde{r}_{R,1,2n+1}) + \angle(-\tilde{r}_{R,2,2n}^H \tilde{r}_{R,2,2n+1})}{2(N+P)}. \quad \text{CP Scheme 2}$$

The operator $\angle(\cdot)$ returns the phase of $(\cdot)$ and hence the returned scalar is within the interval $[-\pi,\pi)$. It is to be noted that $$\hat{\phi}_r = \frac{2\pi\epsilon_r}{N}$$

and hence the maximum normalized CFO that can be estimated is given by the bounds $$|\hat{\epsilon}_r| \leq 0.5\frac{N}{N+P} < 0.5$$

The above limitation can be overcome by designing suitable pilot symbols. The estimated ACFO value $\hat{\Phi}_r$ can be used by the relay to do the compensation during the transmission of actual information.

Cyclic Prefix Scheme 2 may have the advantage that ACFO compensation at relay is not necessary because joint ACFO compensation can be performed at the destination.

ACFO $\hat{\Phi}_d$ Estimation at the Destination

In step 420, ACFO $\hat{\Phi}_d$ estimation is performed at the destination station for either of Cyclic Prefix Schemes 1 or 2.

For Cyclic Prefix Scheme 1, the (N×1) received signal vectors at the destination in the presence of ACFO $\Phi_d$ are given by $$r_{D,2n} = \frac{e^{j(2n(N+P_2)+P_2)\psi_d}}{\sqrt{2}} Z_N(\phi_d)[H_{1,D}H_{S,1}W_N^H x_{2n} + \quad \text{CP Scheme 1}$$

$$H_{2,D}\zeta(H_{S,2}^*)W_N^H T x_{2n+1}^*] + p_{D,2n}$$

$$r_{D,2n+1} = \frac{e^{j((2n+1)(N+P_2)+P_2)\psi_d}}{\sqrt{2}} Z_N(\phi_d)[H_{1,D}H_{S,1}W_N^H x_{2n+1} -$$

$$H_{2,D}\zeta(H_{S,2}^*)W_N^H T x_{2n}^*] + p_{D,2n+1},$$

where the noise vectors are given by $$p_{D,2n} = \frac{e^{j(2n(N+P_2)+P_2)\psi_d}}{\sqrt{2}} Z_N(\phi_d)[H_{1,D}v_{R,1,2n} + H_{2,D}\zeta(v_{R,2,2n+1}^*)] + v_{D,2n}$$

$$p_{D,2n+1} =$$

$$\frac{e^{j((2n+1)(N+P_2)+P_2)\psi_d}}{\sqrt{2}} Z_N(\phi_d)[H_{1,D}v_{R,1,2n+1} - H_{2,D}\zeta(v_{R,2,2n}^*)] + v_{D,2n+1}.$$

Similarly, the (N×1) received signal vectors at the destination for CP Scheme 2 are given by $$r_{D,2n} = \frac{e^{j(2n(N+P_2)+P_2)\phi_d}}{\sqrt{2}} Z_N(\phi_d)[H_{1,D}H_{S,1}W_N^H x_{2n} +$$

$$H_{2,D}G_{S,2}W_N^H T x_{2n+1}^*] + p_{D,2n}$$

$$r_{D,2n+1} = \frac{e^{j((2n+1)(N+P_2)+P_2)\phi_d}}{\sqrt{2}} Z_N(\phi_d)[H_{1,D}H_{S,1}W_N^H x_{2n+1} -$$

$$H_{2,D}G_{S,2}W_N^H T x_{2n}^*] + p_{D,2n+1},$$

CP Scheme 2 where the noise vectors are given by $$\tilde{p}_{D,2n} = \frac{e^{j(2n(N+P_2)+P_2)\phi_d}}{\sqrt{2}} Z_N(\phi_d) R_{cp}[U_{1,D}\tilde{v}_{R,1,2n} + U_{2,D}\zeta(\tilde{v}_{R,2,2n+1}^*)] + v_{D,2n}$$

$$\tilde{p}_{D,2n+1} = \frac{e^{j((2n+1)(N+P_2)+P_2)\phi_d}}{\sqrt{2}} Z_N(\phi_d) R_{cp}[U_{1,D}\tilde{v}_{R,1,2n+1} - H_{2,D}\zeta(\tilde{v}_{R,2,2n}^*)] + v_{D,2n+1}.$$

The following estimation applies for either of Cyclic Prefix Schemes 1 or 2. Using the pilot symbols of $x_{2n}=a$ and $x_{2n}=-a$ that were transmitted by the source, it is assumed that $$W_N^H a = b.$$

The (N×N) matrix $W_N^H$ is the inverse discrete Fourier transform (IDFT) matrix. Therefore, vector $H_{1,D}H_{S,1}W_N^H x_{2n}$ can be expressed as $$H_{1,D}H_{S,1}W_N^H x_{2n} = H_{1,D}H_{S,1}b$$
$$= Ah_P,$$

where the (N×(P+1)) Toeplitz matrix A is given by $$A = [[b]^{(0)}, [b]^{(1)}, \ldots, [b]^{(P)}]$$

and the ((P+1)×1) vector $h_P$ is $$h_P = h_{1,D} * h_{S,1}$$

with * denoting convolution operation. Let us assume that $d = W_N^H T a^*$.

Vector $H_{2,D}\zeta(H_{S,2}^*)d$ can be written as $$H_{2,D}\zeta(H_{S,2}^*)d = B\tilde{h}_P,$$

where the (N×(P+1)) Toeplitz matrix B is given by $$B = [[f]^{(-L_1+1)}, [f]^{(-L_1+2)}, \ldots, [f]^{(-L_1+P+1)}]$$

with $f = \zeta(d)$ and the ((P+1)×1) vector $\tilde{h}_P$ is $$\tilde{h}_P = h_{2,D} * \zeta(h_{S,2}^*).$$

Similarly, vector $H_{2,D}G_{S,2}d$ can be expressed as $$H_{2,D}G_{S,2}d = C\tilde{h}_P,$$

where the (N×(P+1)) Toeplitz matrix C is given by $$C = [[f]^{(-2L_2+1)}, [f]^{(-2L_2+2)}, \ldots, [f]^{(-2L_2+P+1)}].$$

Substituting the above results into $r_{D,2n}$ and $r_{D,2n+1}$ and bearing in mind that $r_{D,2n}$ and $r_{D,2n+1}$ are the received signal vectors of the pilot symbols at the destination, $r_{D,2n}$ and $r_{D,2n+1}$ can be rewritten as $$r_{D,2} = \frac{e^{j(2n(N+P_2)+P_2)\phi_d}}{\sqrt{2}} Z_N(\phi_d)[A, B]h_F + p_{D,2n}$$

CP Scheme 1

$$r_{D,2n+1} = \frac{e^{j((2n+1)(N+P_2)+P_2)\phi_d}}{\sqrt{2}} Z_N(\phi_d)[-A, -B]h_F + p_{D,2n+1}$$

$$r_{D,2n} = \frac{e^{j(2n(N+P_2)+P_2)\phi_d}}{\sqrt{2}} Z_N(\phi_d)[A, C]h_F + \tilde{p}_{D,2n}$$

CP Scheme 2

$$r_{D,2n+1} = \frac{e^{j((2n+1)(N+P_2)+P_2)\phi_d}}{\sqrt{2}} Z_N(\phi_d)[-A, -C]h_F + \tilde{p}_{D,2n+1},$$

where the (2(P+1)×1) vector $h_F$ $$h_F = [h_P^T, \tilde{h}_P^T]^T.$$

Let $q_n$ be a (2N×1) vector constructed as $$q_n = [r_{D,2n}^T, r_{D,2n+1}^T]^T$$
$$= F(\phi_d)h_F + e_n,$$

where $e_n = [p_{D,2n}^T, p_{D,2n+1}^T]^T$ for CP Scheme 1 and $e_n = [\tilde{p}_{D,2n}^T, \tilde{p}_{D,2n+1}^T]^T$ for CP Scheme 2. The (2N×2(P+1)) matrix $F(\phi_d)$ is given by $$F(\phi_d) =$$

CP Scheme 1

$$\frac{e^{j(2n(N+P_2)+P_2)\phi_d}}{\sqrt{2}} \begin{bmatrix} Z_N(\phi_d) & 0_{N\times N} \\ 0_{N\times N} & e^{j(N+P_2)\phi_d}Z_N(\phi_d) \end{bmatrix} \begin{bmatrix} A & -B \\ -A & -B \end{bmatrix}$$

$$F(\phi_d) = \frac{e^{j(2n(N+P_2)+P_2)\phi_d}}{\sqrt{2}} \begin{bmatrix} Z_N(\phi_d) & 0_{N\times N} \\ 0_{N\times N} & e^{j(N+P_2)\phi_d}Z_N(\phi_d) \end{bmatrix}$$

CP Scheme 2

$$\begin{bmatrix} A & -C \\ -A & -C \end{bmatrix}.$$

Using $q_n$, a maximum likelihood (ML) based ACFO and CIR estimator can be formulated. The ACFO is estimated as $$\hat{\phi}_d = \arg\min_\phi \left( q_n^H [I_{2N} - F(\phi)(F^H(\phi)F(\phi))^{-1} F^H(\phi)] q_n \right).$$

$\hat{\Phi}_d$ can be estimated using a grid search.

It is to be noted that, for the pilot symbols used in step 402, the matrix $F^H(\Phi)F(\Phi)$ is given by $$F^H(\Phi)F(\Phi) = NI_{2(P+1)}.$$

This implies that the inverse of $F^H(\Phi)F(\Phi)$ need not be computed for every search point.

Hence the ACFO $\hat{\Phi}_d$ can be estimated as $$\hat{\phi}_d = \arg\min_\phi \left( q_n^H \left[ I_{2N} - \frac{1}{N} F(\phi) F^H(\phi) \right] q_n \right).$$

It can be seen that the ACFO $\hat{\Phi}_d$ estimation at the destination is not computationally demanding as no inverse matrix computation needs to be done for each search point.

Once the ACFO $\hat{\Phi}_d$ is estimated, vector $h_F$ can be estimated as $$\hat{h}_F = \frac{1}{N} F(\hat{\phi}_d) F^H(\hat{\phi}_d) q_n.$$

Joint ACFO ($\Phi_r + \Phi_d$) Estimation at the Destination

In step 430, joint ACFO ($\Phi_r + \Phi_d$) estimation is performed at the destination for the Cyclic Prefix Scheme 2. The (N×1) received signal vectors at destination (without ACFO compensation at relay) can be written as follows:

$$r_{D,2n} = e^{j(2n(N+P_2)+P_2)(\phi_d+\phi_r)}$$
$$Z_N(\phi_d+\phi_r)[\alpha_n \check{H}_{1,D}H_{S,1}W_N^H x_{2n} + \gamma_n \check{H}_{2,D}G_{S,2}(W_N^H x_{2n+1})^*] + \tilde{p}_{D,2n}$$

$$r_{D,2n+1} = e^{j((2n+1)(N+P_2)+P_2)(\phi_d+\phi_r)} Z_N(\phi_d+\phi_r)\big[$$
$$\alpha_n e^{jP_1\phi_r}\check{H}_{1,D}H_{S,1}W_N^H x_{2n+1} - \gamma_n e^{jP_1\phi_r}\check{H}_{2,D}G_{S,2}(W_N^H x_{2n})^*\big] + \tilde{p}_{D,2n+1},$$

where $\check{H}_{1,D}$ and $\check{H}_{2,D}$ respectively are (N×N) circulant matrix with $Z_N(-\Phi_r)[h_{1,D}^T, 0_{1\times(N-L_2)}]^T$ and $Z_N(-\Phi_r)[h_{2,D}^T, 0_{1\times(N-L_2)}]^T$ as their first column vectors, and scalars $\alpha_n$ and $\gamma_n$ are defined as follows:

$$\alpha_n = e^{j(2n+1)P_1\Phi_r},$$

$$\gamma_n = e^{-j((4n+2)(N+P)-2nP_1-1)\Phi_r}.$$

It is defined that $\Phi_f = \Phi_d + \Phi_r$. We have $$q_n = [r_{D,2n}^T, r_{D,2n+1}^T]^T$$
$$= \tilde{F}(\phi_f, \phi_r)\tilde{h}_F + e_n,$$

where the (2N×2(P+1)) matrix $\tilde{F}(\Phi_f, \Phi_r)$ is given by $$\tilde{F}(\phi_f, \phi_r) = \frac{e^{j(2n(N+P_2)+P_2)\phi_f}}{\sqrt{2}} \begin{bmatrix} Z_N(\phi_f) & 0_{N\times N} \\ 0_{N\times N} & e^{j(N+P_2)\phi_f} Z_N(\phi_f) \end{bmatrix}$$
$$\begin{bmatrix} \alpha_n A & -\gamma_n C \\ -\alpha_n e^{jP_1\phi_r} A & -\gamma_n e^{jP_1\phi_r} C \end{bmatrix}$$

and $\tilde{h}_F$ is a (2(P+1)×1) vector constructed as $$\tilde{h}_F = [(\check{h}_{1,D} * h_{S,1})^T, (\check{h}_{2,D} * \zeta(h^*_{S,2}))^T]^T$$

with $\check{h}_{1,D} = Z_{L_2}(-\Phi_r)h_{1,D}$ and $\check{h}_{2,D} = Z_{L_2}(-\Phi_r)h_{2,D}$. It can be shown that $$\tilde{F}^H(\Phi_f, \Phi_r)\tilde{F}(\Phi_f, \Phi_r) = N I_{2(P+1)}.$$

The Maximum Likelihood estimate for $\Phi_f$ is obtained as $$\hat{\phi}_f = \arg\min_{\phi}\left(q_n^H\left[I_{2N} - \frac{1}{N}\tilde{F}(\phi, \phi_r)\tilde{F}^H(\phi, \phi_r)\right]q_n\right)$$

and $\tilde{h}_F$ is estimated as $$\hat{h} = \frac{1}{N}\tilde{F}(\hat{\phi}_f, \phi_r)\tilde{F}^H(\hat{\phi}_f, \phi_r)q_n.$$

While example embodiments of the invention have been described in detail, many variations are possible within the scope of the invention as will be clear to a skilled reader. Variations can be made, for example to parameters such as the number of carriers, the cyclic prefix lengths P, $P_1$ and $P_2$, the coding technique used at the relay station, or the way in which the product channel is estimated. Variations can also be made to the design of the pilot symbols used. Further, the CP schemes need not necessary use space-time coding and other forms of coding may be used.

The invention claimed is:

1. A method of estimating channel state information for a wireless communication channel comprising a source, a relay station having multiple antennae and a destination, the method comprising the steps of:
   a first of the antennae of the relay station receiving a first training signal from the source;
   a second of the antennae of the relay station receiving a second training signal from the source;
   the relay station:
   (i) encoding the first training signal and the second training signal with space-time encoding to form multiple Alamouti-coded relay training signals; and
   (ii) transmitting the multiple Alamouti-coded relay training signals in at least one symbol interval; and
   the destination receiving the relay training signals and from the Alamouti-coded relay training signals estimating the channel state information, wherein the Alamouti-coded relay training signals are also used for performing carrier frequency offset (CFO) compensation at the destination.

2. A method of estimating channel state information for a wireless communication channel according to claim 1, further comprising the step of estimating a first carrier frequency offset (CFO) parameter at the relay station by combining the first training signal and the second training signal.

3. A method of estimating channel state information for a wireless communication channel according to claim 2, wherein the combining the first training signal and the second training signal performs a conjugate transpose to the first training signal.

4. A method of estimating channel state information for a wireless communication channel according to claim 2, further comprising the step of receiving at a destination station a combined training signal, the combined training signal comprising the multiple relay training signals and a combined noise signal.

5. A method of estimating channel state information for a wireless communication channel according to claim 4, wherein the combined noise signal comprises a second carrier frequency offset (CFO) estimated by the destination.

6. A method of estimation channel state information for a wireless communication channel according to claim 5, wherein the second CFO is estimated by a maximum likelihood estimation.

7. A method of estimation channel state information for a wireless communication channel according to claim 6, wherein the maximum likelihood estimation is a grid search.

8. A method of estimation channel state information for a wireless communication channel according to claim 5, wherein the destination station is configured to perform a CFO compensation using the second CFO parameter.

9. A method of estimation channel state information for a wireless communication channel according to claim 5, wherein the first CFO parameter estimated at the relay station is forwarded to the destination, the destination configured to perform a joint CFO compensation using the first CFO parameter and the second CFO parameter.

10. A method of estimation channel state information for a wireless communication channel according to claim 2, wherein the relay station is configured to perform a CFO compensation using the first CFO parameter.

11. A method of estimating channel state information for a wireless communication channel according to claim 1, wherein the first training signal comprises a first pilot signal, and the second training signal comprises a second pilot signal, the second pilot signal a negative of the first pilot signal.

12. A method of transmitting data along a wireless communication channel from a source to a destination via a relay station having multiple antenna, the method comprising:
    estimating channel information of the channel by a method according to claim 1,
    transmitting along the wireless communication channel a message containing the data; and
    extracting the data from the message using the estimated channel information.

\* \* \* \* \*